(12) United States Patent
Shibata

(10) Patent No.: US 11,216,225 B2
(45) Date of Patent: Jan. 4, 2022

(54) FIRST COMMUNICATION DEVICE AND NON-TRANSITORY COMPUTER-READABLE MEDIUM STORING COMPUTER-READABLE INSTRUCTIONS FOR FIRST COMMUNICATION DEVICE

(71) Applicant: BROTHER KOGYO KABUSHIKI KAISHA, Nagoya (JP)

(72) Inventor: Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/004,128

(22) Filed: Aug. 27, 2020

(65) Prior Publication Data

US 2021/0064310 A1 Mar. 4, 2021

(30) Foreign Application Priority Data

Aug. 29, 2019 (JP) .............................. JP2019-157247

(51) Int. Cl.
*G06F 3/12* (2006.01)
*H04W 12/06* (2021.01)
(Continued)

(52) U.S. Cl.
CPC .......... *G06F 3/1236* (2013.01); *G06F 3/1222* (2013.01); *G06F 3/1231* (2013.01);
(Continued)

(58) Field of Classification Search
None
See application file for complete search history.

(56) References Cited

U.S. PATENT DOCUMENTS

2010/0202426 A1* 8/2010 Matsuda ............. H04L 63/0442
370/338
2015/0245393 A1 8/2015 Lee et al.
(Continued)

FOREIGN PATENT DOCUMENTS

KR 2019-0032845 A 3/2019

OTHER PUBLICATIONS

Wi-Fi Peer-to-Peer (P2P) Technical Specification Version 1.1, 2010.
(Continued)

*Primary Examiner* — Dov Popovici
(74) *Attorney, Agent, or Firm* — Scully, Scott, Murphy & Presser, PC

(57) ABSTRACT

A first communication device may execute an output control process of externally outputting output information, the output information obtained using a public key of the first communication device, receive an authentication request from a second communication device that has obtained the public key, send a first authentication response to the second communication device via a wireless interface in a case where it is determined that a wireless connection has been established between the first communication device and a first access point, the first authentication response including first role information indicating that the first communication device is to serve a first role which is a role of sending first wireless setting information to the second communication device, and send the first wireless setting information to the second communication device.

11 Claims, 16 Drawing Sheets

(51) Int. Cl.
*G06K 7/10* (2006.01)
*G06K 7/14* (2006.01)
*H04W 12/04* (2021.01)

(52) U.S. Cl.
CPC .......... *G06F 3/1292* (2013.01); *G06F 3/1293* (2013.01); *G06K 7/10722* (2013.01); *G06K 7/1417* (2013.01); *H04W 12/04* (2013.01); *H04W 12/06* (2013.01)

(56) References Cited

U.S. PATENT DOCUMENTS

| | | | |
|---|---|---|---|
| 2018/0069718 A1* | 3/2018 | Terao | H04L 12/28 |
| 2019/0089686 A1* | 3/2019 | Jung | H04W 12/50 |
| 2021/0099305 A1* | 4/2021 | Shibata | H04L 63/0442 |
| 2021/0099950 A1* | 4/2021 | Shibata | H04W 48/20 |

OTHER PUBLICATIONS

Device Provisioning Protocol Technical Specification Version 1.1, Wi-Fi Alliance, 2018.
Draft Device Provisioning Protocol Technical Specification Version 0.2.11, Wi-Fi Alliance, 2017.
Extended European Search Report dated Feb. 1, 2021 from related EP 20193059.1.

* cited by examiner

FIG. 4 (Authentication)

(Network Access (Continuation of FIG. 14))

FIG. 16

| | Terminal | | Printer | | | |
|---|---|---|---|---|---|---|
| | AP Connection | Selection Button | AP Connection | Capability | Establishment | Figures |
| 1 | Connected | AP Communication | Not Connected | Enrollee | AP Connection | FIGS. 2 to 6 |
| 2 | Connected | WFD Communication | Not Connected | Enrollee | WFD Connection | - |
| 3 | Connected | AP Communication | Connected | Enrollee | AP Connection | Case B (FIGS. 10, 11) |
| 4 | Connected | WFD Communication | Connected | Configurator | WFD Connection | - |
| 5 | Not Connected | AP Communication | Not Connected | Enrollee | AP Connection | - |
| 6 | Not Connected | WFD Communication | Not Connected | Enrollee | WFD Connection | - |
| 7 | Not Connected | AP Communication | Connected | Configurator | AP Connection | Case A (FIGS. 8, 9) |
| 8 | Not Connected | WFD Communication | Connected | Configurator | WFD Connection | Case C (FIGS. 12 to 15) |

FIRST COMMUNICATION DEVICE AND NON-TRANSITORY COMPUTER-READABLE MEDIUM STORING COMPUTER-READABLE INSTRUCTIONS FOR FIRST COMMUNICATION DEVICE

CROSS-REFERENCE TO RELATED APPLICATION

This application claims priority to Japanese Patent Application No. 2019-157247 filed on Aug. 29, 2019, the contents of which are hereby incorporated by reference into the present application.

TECHNICAL FIELD

The disclosure herein discloses an art for establishing a wireless connection between a first communication device and another device.

DESCRIPTION OF RELATED ART

A Device Provisioning Protocol (DPP) scheme, which is a wireless communication scheme established by Wi-Fi Alliance, is known. The DPP scheme is a wireless communication scheme for easily establishing a Wi-Fi (Registered Trademark, Wi-Fi Alliance) connection between a pair of devices. In the DPP scheme, a first device serving a role of a Configurator sends information for establishing the Wi-Fi connection to a second device serving a role of an Enrollee. Then, the Wi-Fi connection is established between the second device and the first device.

SUMMARY

The disclosure herein provides an art that enables a first communication device to serve a suitable role based on a situation of the first communication device.

A first communication device disclosed herein may comprise: a wireless interface configured to execute wireless communication in conformity with a Wi-Fi standard, and a controller configured to: execute an output control process of externally outputting output information, the output information being in conformity with the Wi-Fi standard and obtained using a public key of the first communication device; receive, via the wireless interface, an authentication request in which the public key is used from a second communication device that has obtained the public key; determine whether a wireless connection has been established between the first communication device and any one of access points; in a case where it is determined that a wireless connection has been established between the first communication device and a first access point: send a first authentication response to the second communication device via the wireless interface, the first authentication response including first role information indicating that the first communication device is to serve a first role which is a role of sending first wireless setting information to the second communication device, the first wireless setting information being for establishing a first wireless connection between the second communication device and the first access point; and send the first wireless setting information to the second communication device via the wireless interface after the first authentication response has been sent to the second communication device; in a case where it is determined that no wireless connection has been established between the first communication device and any of the access points: send a second authentication response to the second communication device via the wireless interface, the second authentication response including second role information indicating that the first communication device is to serve a second role which is different from the first role and is a role of receiving second wireless setting information from the second communication device, the second wireless setting information being for establishing a second wireless connection between the first communication device and a second access point; receive the second wireless setting information from the second communication device via the wireless interface after the second authentication response has been sent to the second communication device; and establish the second wireless connection with the second access point via the wireless interface using the second wireless setting information.

A method implemented by the above first communication device, a computer program, and non-transitory computer-readable medium storing this computer program are also novel and useful. A communication system comprising the above communication device and the other device (e.g., a second communication device, an external device) is also novel and useful.

BRIEF DESCRIPTION OF THE DRAWINGS

FIG. 16 shows a table that summarizes respective cases of an embodiment.

EMBODIMENTS

Embodiment

Figure 1:
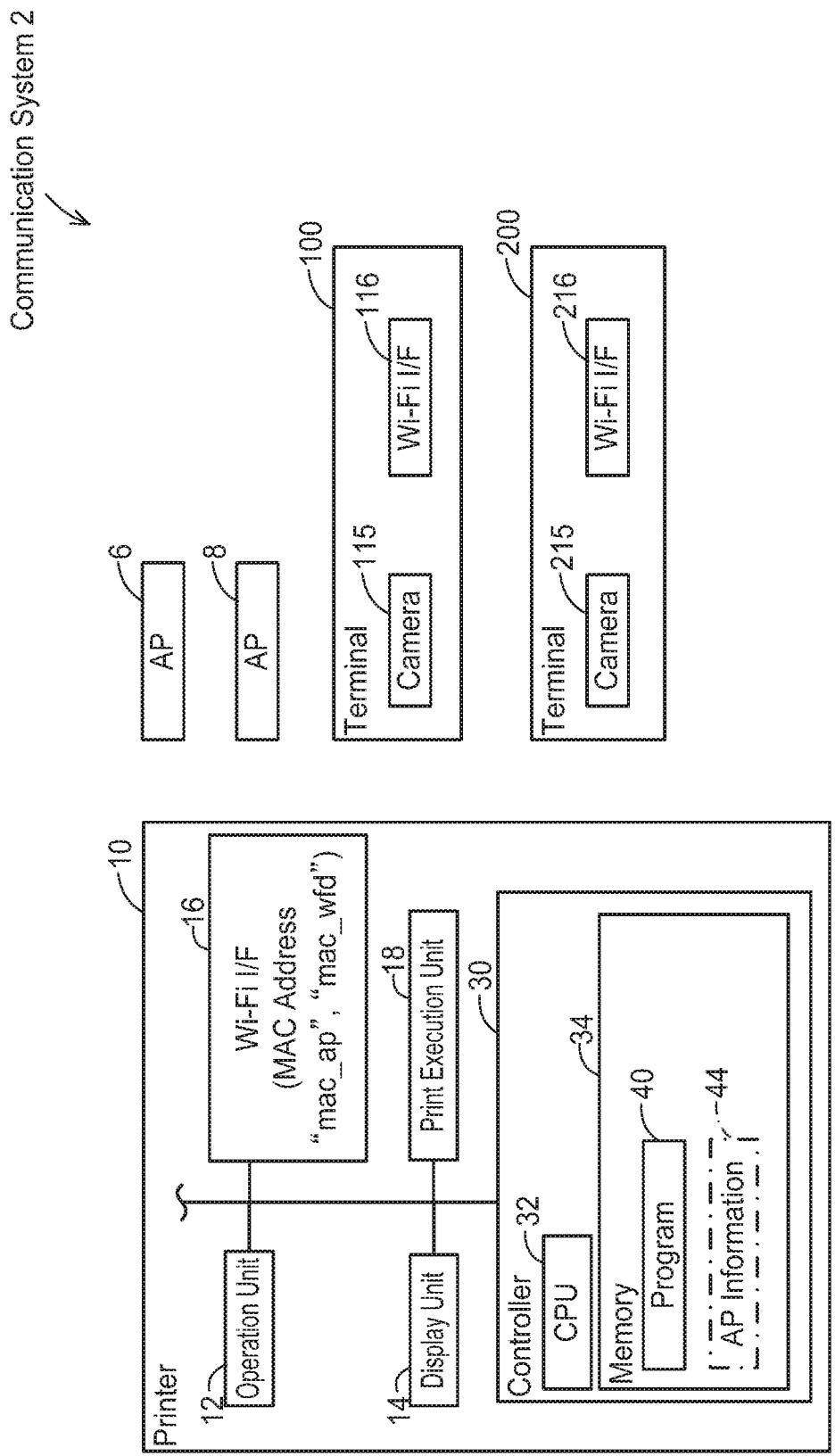
FIG. 1 shows a configuration of a communication system.

Configuration of Communication System 2; FIG. 1

As shown in FIG. 1, a communication system 2 comprises two access points (hereinafter termed "AP") 6, 8, a printer 10, and two terminals 100, 200. In the present embodiment, a user uses the terminal 100 for establishing a wireless connection in conformity with a Wi-Fi standard (hereinafter termed "Wi-Fi connection") between the printer 10 and the AP 6, for example.

Configuration of Terminal 100

The terminal 100 is a portable terminal device such as a cell phone (such as a smartphone), a PDA, and a tablet PC. In a variant, the terminal 100 may be a desktop terminal device. The terminal 100 includes a camera 115 and a Wi-Fi interface 116. Hereinbelow, an interface will simply be termed "I/F".

The camera 115 is a device configured to capture an image of an object, and in the present embodiment, it is used to capture a QR Code (Registered Trademark, DENSO WAVE INCORPORATED) for each of the APs 6, 8 and the printer 10.

The Wi-Fi I/F 116 is a wireless interface for executing communication in conformity with the Wi-Fi standard. The Wi-Fi standard is a standard for executing wireless communication in accordance with the standard 802.11 of the institute of Electrical and Electronics Engineers, Inc. (IEEE) and standards complying therewith (such as 802.11a, 11b, 11g, 11n, etc.). The Wi-Fi I/F 116 supports a Device Provisioning Protocol (DPP) scheme established by the Wi-Fi Alliance. The DPP scheme is described in the specification "Device Provisioning Protocol Technical Specification Version 1.1" created by the Wi-Fi Alliance, and is a scheme for easily establishing a Wi-Fi connection between a pair of devices (such as the printer 10 and the AP 6) by using the terminal 100.

The Wi-Fi I/F 116 further supports a WFD (abbreviation of Wi-Fi Direct (Registered Trademark, Wi-Fi Alliance)) scheme established by the Wi-Fi Alliance. The WFD scheme is a scheme described in the specification "Wi-Fi Peer-to-Peer (P2P) Technical Specification Version 1.1" created by the Wi-Fi Alliance. In the WFD, a Group Owner state (hereinafter termed "G/O state") and a Client state (hereinafter termed "CL state") are defined. Further, in the present embodiment, a state that is different from both the G/O state and the CL state will be termed a "device state". A device that supports the WFD scheme is configured to operate selectively in one of the aforementioned three states. Hereinbelow, the Wi-Fi connection established in accordance with the WFD scheme may be termed a "WFD connection".

Configuration of Terminal 200

The terminal 200 is also a portable terminal device similar to the terminal 100. In a variant, the terminal 200 may be a desktop terminal device. The terminal 200 includes a camera 215 and a Wi-Fi I/F 216, similar to the terminal 100.

Configuration of Printer 10

The printer 10 is a peripheral device configured to execute print function (such as a peripheral device of the terminals 100, 200). The printer 10 comprises an operation unit 12, a display unit 14, a Wi-Fi I/F 16, a print execution unit 18, and a controller 30. The respective units 12 to 30 are connected to a bus line (reference sign omitted).

The operation unit 12 includes a plurality of buttons. The user may input various instructions to the printer 10 by operating the operation unit 12. The display unit 14 is a display configured to display various types of information. The display unit 14 may further include a touchscreen function (i.e., an operation unit). The print execution unit 18 includes a print mechanism such as an inkjet scheme and a laser scheme.

The Wi-Fi I/F 16 supports the DPP scheme and the WFD scheme. Accordingly, the printer 10 can establish a Wi-Fi connection with the AP 6 and further can establish a WFD connection with a terminal (such as the terminal 100) without any intervention of the APs. Hereinbelow, the Wi-Fi connection with the AP 6 may be termed an "AP connection".

The Wi-Fi I/F 16 is allocated with two MAC addresses "mac_ap" and "mac_wfd". The MAC address "mac_ap" is a MAC address used in the AP connection. The MAC address "mac_wfd" is a MAC address used in the WFD connection.

The controller 30 includes a CPU 32 and a memory 34. The CPU 32 is configured to execute various processes in accordance with a program 40 stored in the memory 34. The memory 34 is constituted of volatile memory, nonvolatile memory, and/or the like.

Further, the memory 34 may store AP information 44 that is used to establish the AP connection.

Figure 2:
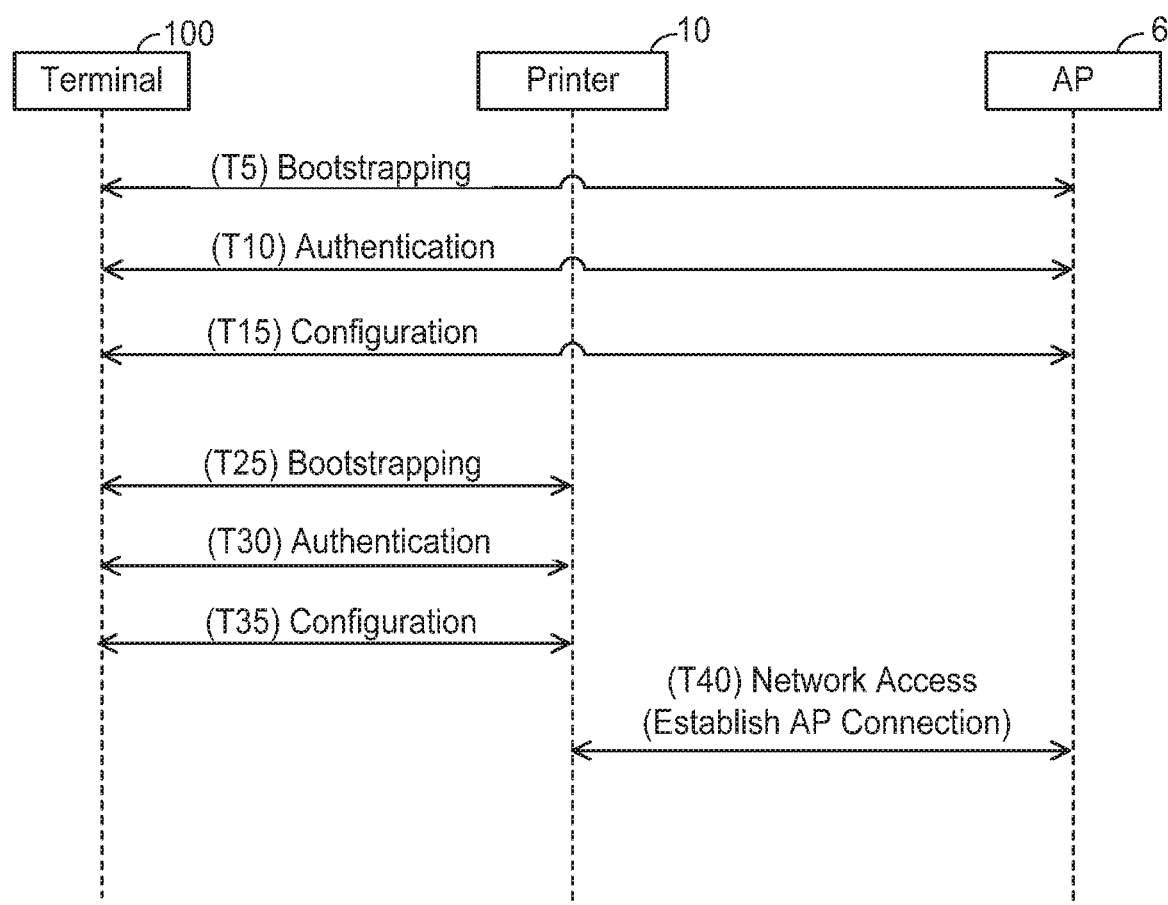
FIG. 2 shows a schematic sequence diagram of a process of establishing a wireless connection in conformity with a DPP scheme between a printer and an access point.

Overview of DPP; FIG. 2

Next, an overview of the DPP will be described with reference to FIG. 2. The AP 6 also supports the DPP scheme. In the present embodiment, establishment of a DPP connection between the printer 10 and the AP 6 is realized by each of the devices 6, 10, 100 executing communication in conformity with the DPP scheme. Hereinbelow, for easier understanding, operations executed by a CPU (such as the CPU 32) of each device will be described with their corresponding device (such as the printer 10) as the subject of action instead of describing the operations with their corresponding CPU as the subject of action.

In T5, the terminal 100 executes Bootstrapping (hereinafter termed "BS") of the DPP scheme with the AP 6. This BS is a process that provides information, which is to be used in Authentication (hereinafter termed "Auth") in T10 as described later, from the AP 6 to the terminal 100 in response to a QR code adhered to the AP 6 being captured by the camera 115 of the terminal 100.

In T10, the terminal 100 uses the information obtained in the BS of T5 and executes the Auth of the DPP scheme with the AP 6. This Auth is a process for each of the terminal 100 and the AP 6 to authenticate its communication counterpart.

In T15, the terminal 100 executes Configuration (hereinafter termed "Config") of the DPP scheme with the AP 6. This Config is a process of sending, to the AP 6, information for the AP 6 to establish the AP connection in conformity with the DPP scheme. Specifically, the terminal 100 generates an Configuration Object to be used by an AP (hereinafter, a Configuration Object will simply be termed "CO", and CO to be used by an AP will simply be termed "AP-CO") and sends this AP-CO to the AP 6. As a result, the AP-CO is stored in the AP 6.

Next, the terminal 100 executes the BS of the DPP scheme with the printer 10 in T25. This BS is a process that provides information, which is to be used in the Auth in T30 as described later, from the printer 10 to the terminal 100 in response to a QR code displayed on the primer 10 being captured by the camera 115 of the terminal 100.

In T30, the terminal 100 uses the information obtained in the BS of T25 and executes the Auth of the DPP scheme with the printer 10. This Auth is a process for each of the terminal 100 and the printer 10 to authenticate its communication counterpart.

In T35, the terminal 100 executes the Config of the DPP scheme with the printer 10. This Config is a process of sending, to the printer 10, information for establishing the DPP connection between the printer 10 and the AP 6. In this Config, the terminal 100 generates a first printer-CO for a printer, which is for establishing an AP connection between the printer 10 and the AP 6, and sends this first printer-CO to the printer 10. As a result, the first printer-CO is stored in the printer 10.

In T40, the printer 10 and the AP 6 use the stored AP-CO and first printer-CO and execute Network Access (hereinafter termed "NA") of the DPP scheme. The NA is a process for sharing connection keys for establishing the AP connection in conformity with the DPP scheme between the printer 10 and the AP 6. After this, the printer 10 and the AP 6 execute 4-way handshake communication. In at least a part of processes in the 4-way handshake communication, the primer 10 and AP 6 communicate encrypted information encrypted by the shared connection keys. Then, in a case where decryption of the encrypted information is successful, the AP connection is established between the printer 10 and the AP 6. The printer 10 can thereby participate as a child station in a wireless network formed by the AP 6. In a variant, the primer 10 and AP 6 may execute Simultaneous Authentication of Equals (SAE; so-called "Dragonfly") communication instead of the 4-way handshake communication.

In the DPP scheme, in order to establish the AP connection between the printer 10 and the AP 6, the user does not need to input information (such as a SSID and a password) on the wireless network in which the AP 6 operates as a parent station to the printer 10. Thus, the user can easily establish the AP connection between the printer 10 and the AP 6.

Details of Respective Processes; FIGS. 3 to 6

Next, details of the respective processes executed in T25 to T40 of FIG. 2 will be described with reference to FIGS. 3 to 6.

Figure 3:
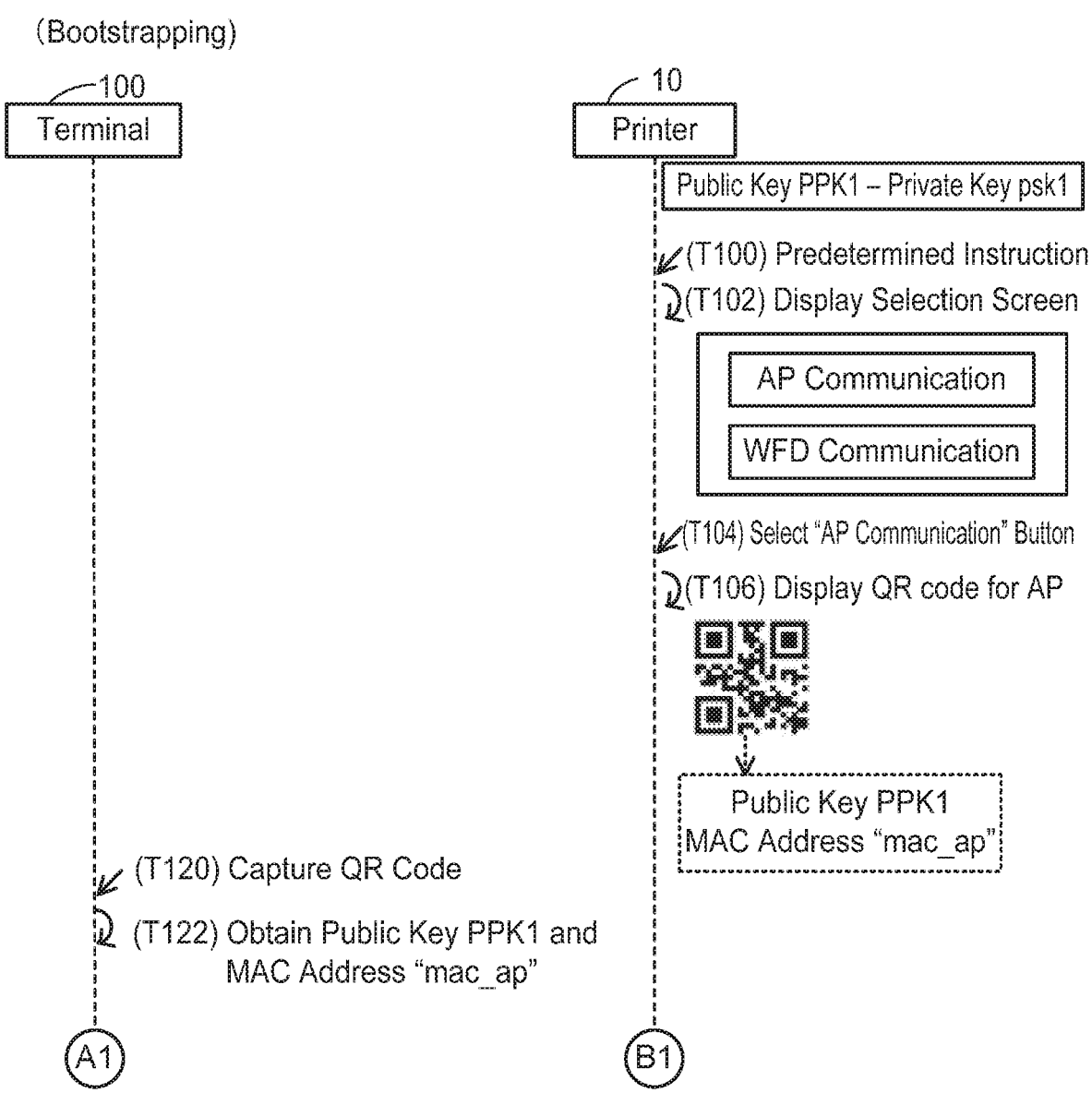
FIG. 3 shows a sequence diagram of a Bootstrapping process.

Bootstrapping (BS); FIG. 3

Firstly, the BS process executed in T25 of FIG. 2 will be described with reference to FIG. 3. In an initial state of FIG. 3, the memory 34 of the printer 10 stores a public key PPK1 and a private key psk1 of the printer 10 in advance. Further, in the initial state of FIG. 3, the memory 34 does not store the AP information 44.

In T100, the user operates the operation unit 12 and inputs a predetermined instruction to the printer 10. When the input of the predetermined instruction is accepted from the user in T100, the printer 10 displays a selection screen on the display unit 14 in T102. The selection screen is a screen for selecting a communication method. The selection screen includes an "AP Communication" button indicating that communication via an AP is to be used and a "WFD Communication" button indicating that communication in conformity with the WFD scheme without intervention of any APs is to be used. Alternatively, the selection screen may not be displayed. In this case, for example, an AP-QR code for an AP (sec T106) may be displayed in a case of accepting an instruction from the user in a first screen related to use of the communication through an AP, while a WFD-QR code for the WFD (see T856 of FIG. 12) may be displayed in a case of accepting an instruction from the user in a second screen different from the first screen and related to use of the communication in conformity with the WFD.

In T104, the user operates the operation unit 12 and selects the "AP Communication" button in the selection screen. When the selection of the "AP Communication" button is accepted from the user in T104, the printer 10 displays the AP-QR code on the display unit 14 in T106. The AP-QR code is obtained by encoding the public key PPK1 of the printer 10 and the MAC address "mac_ap" used in the AP connection.

The terminal 100 activates the camera 115 of the terminal 100 in response to accepting an operation from the user, and in T120, captures the AP-QR code displayed in T100 by using the camera 115. Then, in T122, the terminal 100 decodes the captured AP-QR code and obtains the public key PPK1 and the MAC address "mac_ap". When the process of T122 is completed, the process of FIG. 3 is terminated.

Figure 4:
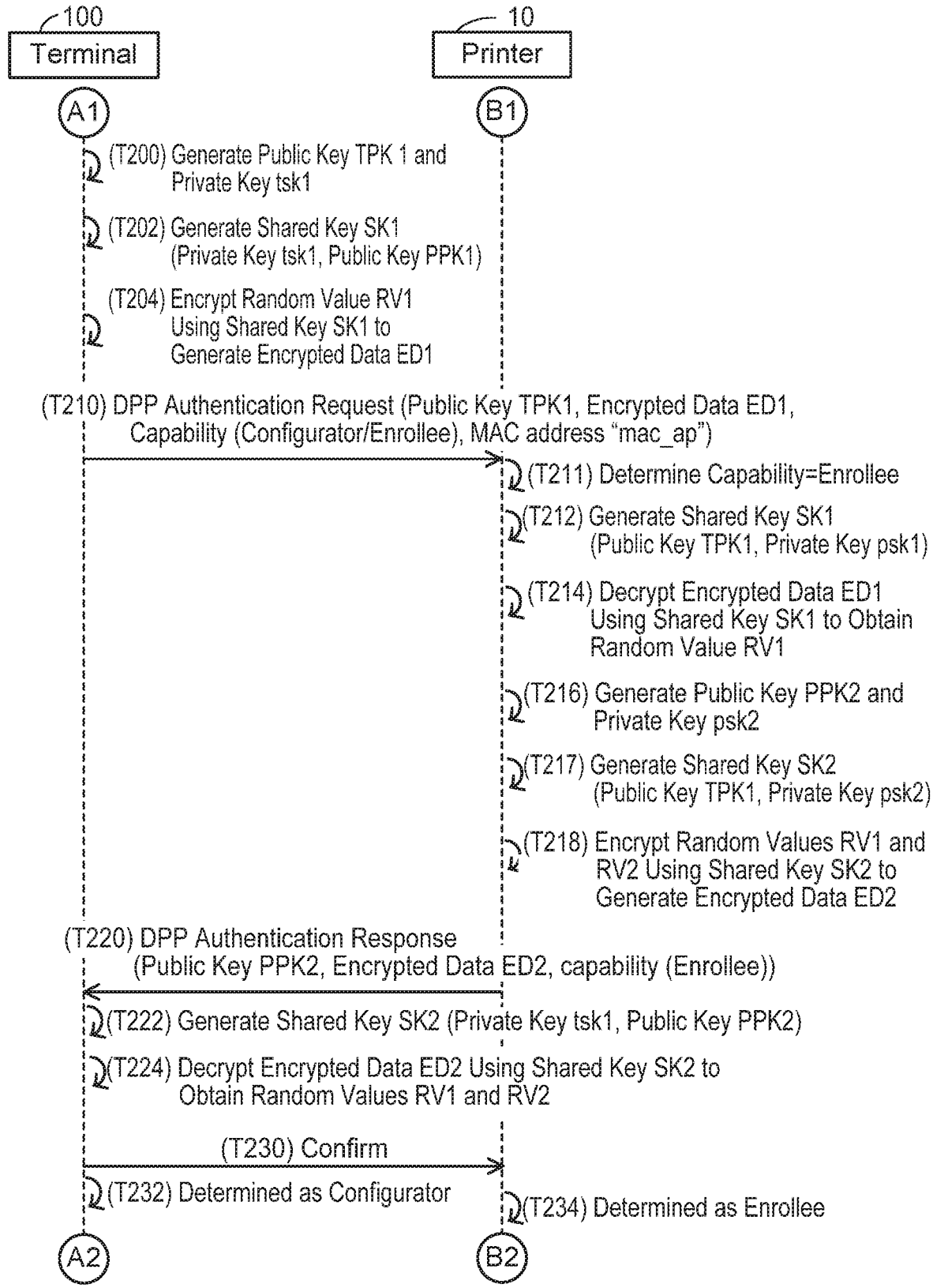
FIG. 4 shows a sequence diagram of an Authentication process.

Authentication (Auth); FIG. 4

Next, the Auth process executed in T30 of FIG. 2 will be described with reference to FIG. 4. All communication executed between the terminal 100 and the printer 10 hereinafter is executed via the Wi-Fi I/F 116 of the terminal 100 and the Wi-Fi I/F 16 of the printer 10. As such, hereinafter, the description "via the Wi-Fi I/F 116 (or 16)" will be omitted.

In T200, the terminal 100 generates a public key TPK1 and a private key tsk1 of the terminal 100. Then, in T202, the terminal 100 generates a shared key SK1 in conformity with Elliptic curve Diffie-Hellman key exchange (ECDH) using the generated private key tsk1 and the public key PPK1 of the printer 10 obtained in T122 of FIG. 3. Then, in T204, the terminal 100 encrypts a random value RV1 using the generated shared key SK1 and generates encrypted data ED1.

In T210, the terminal 100 sends a DPP Authentication Request (hereinafter termed "AReq") to the printer 10 with the MAC address "mac_ap" obtained in T122 of FIG. 3 as a recipient. The AReq is a signal that requests the printer 10 to execute authentication. The AReq includes the public key TPK1 of the terminal 100 generated in T200, the encrypted data ED1 generated in T204, a capability of the terminal 100, and the MAC address "mac_ap".

The capability is information that is pre-designated in a device supporting the DPP scheme and includes a value which is one of: a value indicating that the device is capable of operating only as a Configurator in conformity with the DPP scheme, a value indicating that the device is capable of operating only as an Enrollee in conformity with the DPP scheme, and a value indicating that the device is capable of operating as both the Configurator und the Enrollee. The Configurator refers to a role configured to send a CO that is to be used in NA (e.g., T40 of FIG. 2) to the Enrollee in Config (e.g., T35 of FIG. 2). On the other hand, the Enrollee refers to a role configured to receive the CO that is to be used in the NA from the Configurator in the Config. In this case AReq includes a value the device is capable of operating as both the Configurator and the Enrollee as the capability of the terminal 100.

In T210, the printer 10 receives the AReq from the terminal 100. As aforementioned, the AReq is sent with the MAC address "mac_ap" of the Wi-Fi I/F 16 of the printer 10 as the recipient. Thus, the printer 10 can suitably receive the AReq from the terminal 100.

When the AReq is received from the terminal 100 in T210, the printer 10 executes the process of FIG. 7 (to be described later) in T211 and determines a capability of the printer 10 as the Enrollee.

Then, the printer 10 executes a process for authenticating a sender of the AReq (i.e., the terminal 100). Specifically, the printer 10 generates a shared key SK1 using the public key TPK1 of the terminal 100 in the AReq and the private key psk1 of the printer 10 in T212. Here, the shared key SK1 generated by the terminal 100 in T202 and the shared key SK1 generated by the printer 10 in T212 match (are identical). Due to this, in T214, the printer 10 can suitably decrypt the encrypted data ED1 in the AReq using the generated shared key SK1, as a result of which it can obtain the random value RV1. In a case where this decryption of the encrypted data ED1 is successful, the printer 10 determines that the tender of the AReq is the device that had captured the QR code displayed in T106 of FIG. 3, that is, determines that the authentication was successful, and executes the processes from T216. On the other hand, in a case where the decryption of the encrypted data ED1 is unsuccessful, the printer 10 determines that the sender of the AReq is not the device that had captured the QR code displayed in T106, that is, determines that the authentication failed, and does not execute the processes from T216.

In T216, the printer 10 generates a new public key PPK2 and a new private key psk2 of the printer 10. In a variant, the printer 10 may store the public key PPK2 and the private key psk2 in advance. Then, in T217, the printer 10 generates a shared key SK2 in conformity with the ECDH using the public key TPK1 of the terminal 100 in the AReq of T210 and the generated private key psk2 of the printer 10. Then, in T218, the printer 10 encrypts the obtained random value RV1 and a new random value RV2 using the generated shared key SK2 and generates encrypted data ED2.

In T220, the printer 10 sends a DPP Authentication Response (hereinafter termed "ARes") to the terminal 100. This ARes includes the public key PPK2 of the printer 10 generated in T216, the encrypted data ED2 generated in T218, and the capability of the primer 10 (i.e., a value indicating that it is capable of operating only as the Enrollee) determined in T211.

In T220, the terminal 100 receives the ARes from the printer 10. In this case, the terminal 100 executes a process for authenticating a sender of the ARes (i.e., the printer 10). Specifically, in T222, the terminal 100 generates a shared key SK2 in conformity with the ECDH using the private key tsk1 of the terminal 100 generated in T200 and the public key PPK2 of the printer 10 in the ARes. Here, the shared key SK2 generated by the printer 10 in T217 and the shared key SK2 generated by the terminal 100 in T222 match. Due to this, in T224, the terminal 100 can suitably decrypt the encrypted data ED2 in the ARes using the generated shared key SK2, as a result of which it can obtain the random values RV1 and RV2. In a case where this decryption of the encrypted data ED2 is successful, the terminal 100 determines that the sender of the ARes is the device that possesses the captured QR code, that is, determines that the authentication was successful, and executes the processes from T230. On the other hand, in a case where the decryption of the encrypted data ED2 is unsuccessful, the terminal 100 determines that the sender of the ARes is not the device that stores the captured QR code, that is, determines that the authentication failed, and does not execute the processes from T230.

In T230, the terminal 100 sends a Confirm to the printer 10. The Confirm includes information indicating that the terminal 100 is to operate as the Configurator and the printer 10 is to operate as the Enrollee. As a result, the terminal 100 determines to operate as the Configurator in T232 and the printer 10 determines to operate as the Enrollee in T234. When the process of T234 is completed, the process of FIG. 4 is terminated.

Figure 5:
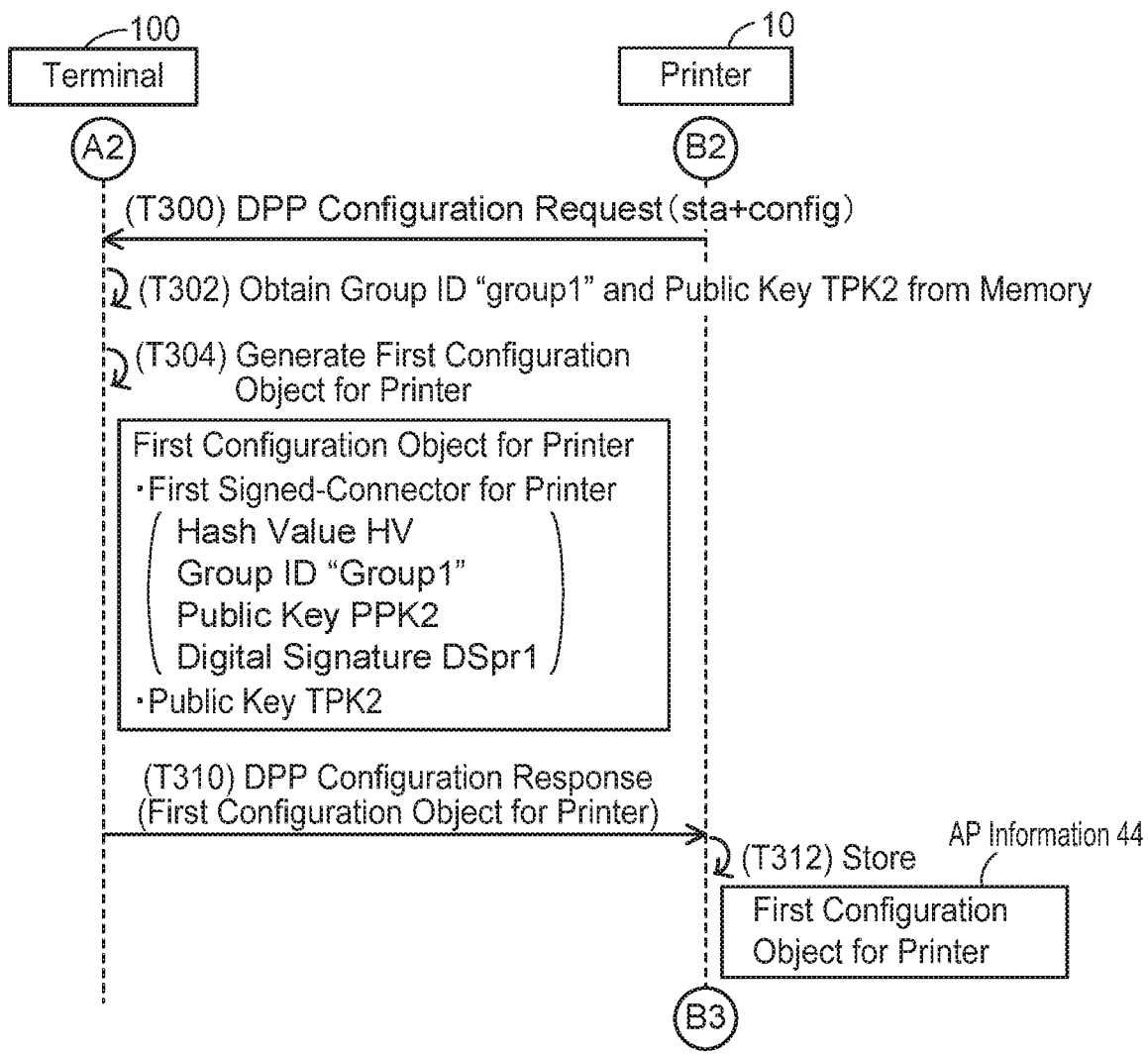
FIG. 5 shows a sequence diagram of a Configuration process.

Configuration (Config); FIG. 5

Next, the Config process executed in T35 of FIG. 2 will be described with reference to FIG. 5. In T300, the printer 10 sends a DPP Configuration Request (hereinafter termed "CReq") to the terminal 100. The CReq is a signal requesting to send the first printer-CO. The CReq includes a value "sta" indicating that the printer 10 is to receive the first printer-CO. Further, the CReq includes a value "config" requesting operation information for the printer 10 to operate as the Configurator. For example, Case A (FIGS. 8 and 9) may be assumed in which communication in conformity with the DPP scheme is executed between the printer 10 and the terminal 100 after the processes of FIGS. 3 to 6 have been completed and the AP connection has been established between the printer 10 and the AP 6. In this case, the printer 10 operates as the Configurator, uses the first printer-CO, generates a first terminal-CO for a terminal, and sends the first terminal-CO to the terminal 200. In the present case, the printer 10 sends the CReq including the value "config" to the terminal device 100 in advance in T300 prior to Case A which later takes place. By doing so, the printer 10 becomes able to operate as the Configurator, use the first printer-CO obtained from the terminal 100, and generate the first terminal-CO in Case A which later takes place.

When the CReq is received from the printer 10 in T300, the terminal 100 obtains a group ID "Group1", the public key TPK2, and the private key tsk2 from a memory (not shown) of the terminal 100 in T302. As aforementioned, the terminal 100 has already executed the Config in T15 of FIG. 2 with the AP 6, and generated the group ID "Group1", the public key TPK2, and the private key tsk2 at this occasion and stored them in the memory. The group ID "Group1" is information for identifying a wireless network formed by the Wi-Fi connection between the printer 10 and the AP 6 being established. In a variant, a letter string designated by the user may be used as the group ID. That is, in T302, the terminal 100 obtains the respective pieces of information stored in T15 of FIG. 2. Then, in T304, the terminal 100 generates the first printer-CO. Specifically, the terminal 100 executes the following processes.

The terminal 100 firstly hashes the public key TPK2 of the terminal 100 to generate a hash value HV1. Further, the terminal 100 hashes combination of the hash value HV1, the group ID "Group1", and the public key PPK2 of the printer 10 in the A Res in T220 of FIG. 4 to generate a specific value. Then, the terminal 100 generates a digital signature DSpr1 by using the private key tsk2 of the terminal 100 to encrypt the generated specific value in conformity with Elliptic Curve Digital Signature Algorithm (ECDSA). As a result, the terminal 100 can generate a first printer-Signed-Connector for a printer (hereinafter, the Signed-Connector will simply be termed "SC") including the hash value HV1, the group ID "Group1", the public key PPK2 of the printer 10, and the digital signature DSpr1. Then, the terminal 100 generates the first printer-CO including the first printer-SC and the public key TPK2 of the terminal 100.

In T310, the terminal 100 sends a DPP Configuration Response (hereinafter termed "CRes") including the first printer-CO to the printer 10. Here, the CRes includes operation information as a response to the value "config" in the CReq. The operation information includes information (such as the private key tsk2 of the terminal 100) for the printer 10 to operate as the Configurator and generate the first terminal-CO for another terminal (such as the terminal 200).

When the CRes is received from the terminal 100 in T310, the printer 10 stores the first printer-CO in the CRes in T312. The first printer-CO is information to be used in establishing the AP connection with the AP 6, and thus can be said as being connection information for establishing the AP connection with the AP 6. The printer 10 stores the first printer-CO as the AP information 44. When the process of T312 is completed, the process of FIG. 5 is terminated.

Figure 6:
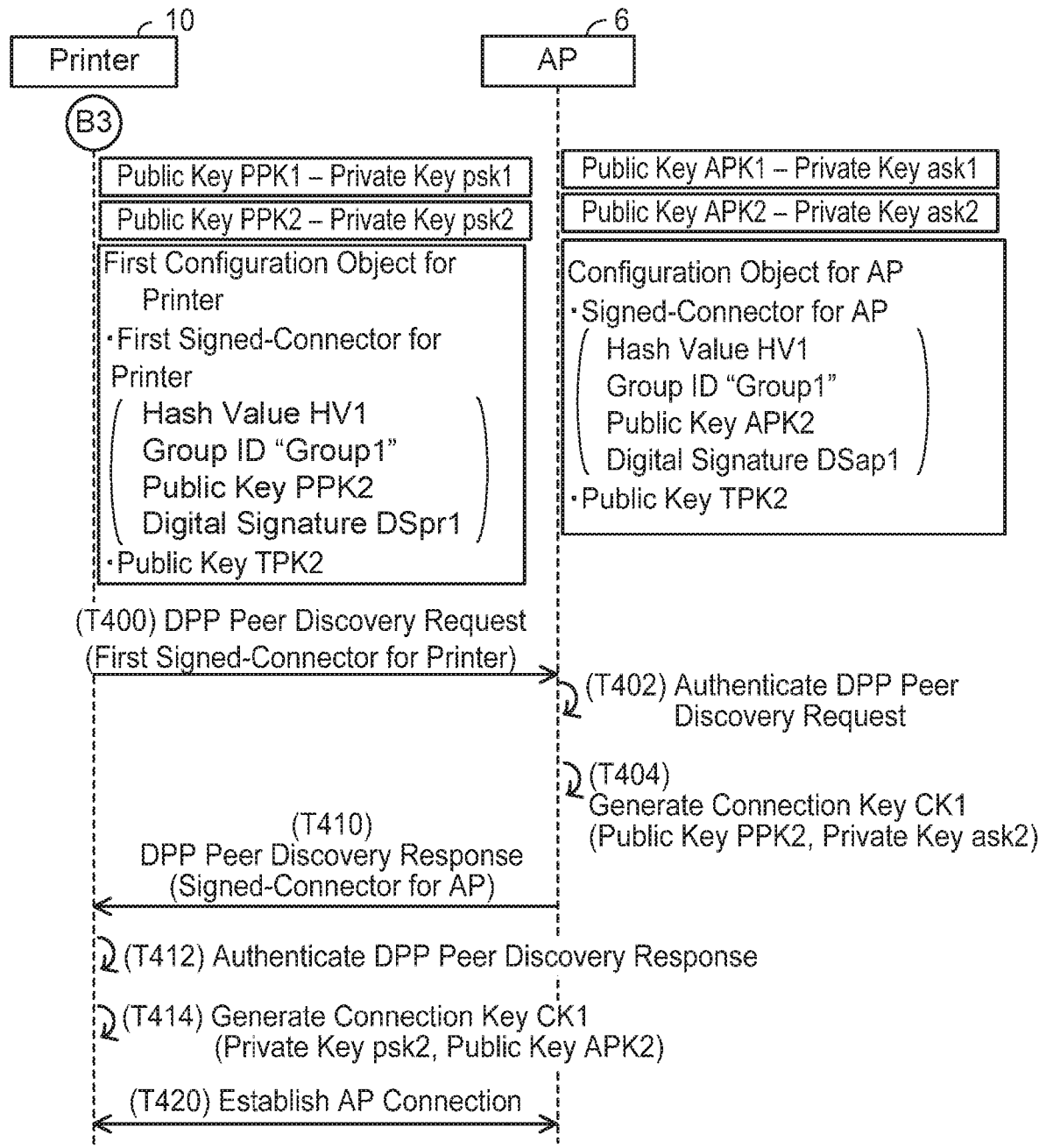
FIG. 6 shows a sequence diagram of a Network Access process.

Network Access (NA); FIG. 6

Next, the NA process in T40 of FIG. 2 will be described with reference to FIG. 6. As aforementioned, similar to T25 to T35 of FIG. 2, the processes of T5 to T15 have been already executed between the terminal 100 and the AP 6. The AP 6 stores a public key APK1 and a private key ask1 of the AP 6 in advance. Further, the QR code obtained by encoding the public key APK1 of the AP 6 and a MAC address of the AP 6 is adhered to a housing of the AP 6. When the terminal 100 captures this QR code, processes similar to the respective processes from T200 of FIG. 4 are executed between the terminal 100 and the AP 6. As a result, the AP 6 stores a public key APK2 and a private key ask2 of the AP 6 (see T216 of FIG. 4) and further stores the AP-CO received from the terminal 100 (see T312 of FIG. 5). The AP-CO includes an AP-SC for an AP and the public key TPK2 of the terminal 100. This public key TPK2 matches the public key TPK2 included in the first printer-CO. Further, the AP-SC includes the hash value HV1, the group ID "Group1", the public key APK2 of the AP 6, and a digital signature DSap1. The hash value HV1 and group ID "Group1" hereof match the hash value HV1 and the group ID "Group1" included in the first printer-CO. The digital signature DSap1 is information obtained by a specific value, which is obtained by hashing a combination of the hash value HV1, the group ID "Group1", and the public key APK2, being encrypted by the private key tsk2 of the terminal 100, and is a value that differs from the digital signature DSpr1 included in the first printer-CO.

In T400, the printer 10 sends a DPP Peer Discovery Request (hereinafter termed "DReq") including the first printer-SC to the AP 6. The DReq is a signal requesting the AP 6 to execute authentication and send the AP-SC.

When the DReq is received from the printer 10 in T400, the AP 6 executes a process for authenticating a sender of the DReq (i.e., the printer 10) and the respective pieces of information in the DReq (i.e., the hash value HV1, the "Group1", and the public key PPK2). Specifically, in T402, the AP 6 firstly executes a first AP determination process related to whether the hash value HV1 and the group ID "Group1" in the received first printer-SC respectively match the hash value HV1 and the group ID "Group1" in the AP-SC included in the stored AP-CO. In the case shown in FIG. 6, since the AP 6 determines a match in the first AP determination process, it determines that the authentication of the sender of the DReq (i.e., the printer 10) was successful. The hash value HV1 in the received first printer-SC and the hash value HV1 in the AP-SC included in the stored AP-CO matching means that the first printer-SC and the AP-SC were generated by a same device (i.e., the terminal 100). Thus, the AP 6 also determines that the authentication of a generator of the received first printer-SC (i.e., the terminal 100) was successful.

The AP 6 further decrypts the digital signature DSpr1 in the received first printer-SC by using the public key TPK2 of the terminal 100 included in the stored AP-CO. In the case shown in FIG. 6, the decryption of the digital signature DSpr1 is successful, thus the AP 6 executes a second AP determination process related to whether the specific value obtained by decrypting the digital signature DSpr1 matches the value obtained by hashing the respective pieces of information (i.e., the hash value HV1, the "Group1", and the public key PPK2) in the received first printer-SC. In the case shown in FIG. 6, the AP 6 determines a match in the second AP determination process, thus determines that the authentication of the respective pieces of information in the DReq was successful and executes processes from T404. The match being determined in the second AP determination process means that the respective pieces of information (i.e., the hash value HV1, the "Group1", and the public key PPK2) in the received first printer-SC have not been tampered by a third party after the first printer-CO was stored in the printer 10. On the other hand, the AP 6 determines that the authentication failed and does not execute the processes from T404 in each case where a match is not determined in the first AP determination process, the decryption of the digital signature DSpr1 fails, and a match is not determined in the second AP determination process.

Next, in T404, the AP 6 generates a connection key (i.e., an shared key) CK1 in conformity with the ECDH using the obtained public key PPK2 of the printer 10 and the stored private key ask2 of the AP 6.

In T410, the AP 6 sends a DPP Peer Discovery Response (hereinafter termed "DRes") including the AP-SC to the printer 10.

When the DRes is received from the AP 6 in T410, the printer 10 executes a process for authenticating a sender of the DRes (i.e., the AP 6) and the respective pieces of information (i.e., hash value HV1, the "Group1", and the public key APK2) in the DRes. Specifically, in T412, the printer 10 firstly executes a first PR determination process related to whether the hash value HV1 and the group ID "Group1" in the received AP-SC respectively match the hash value HV1 and the group ID "Group1" in the first printer-SC included in the stored first printer-CO. In the case shown in FIG. 6, since the printer 10 determines a match in the first PR determination process, it determines that the authentication of the sender of the DRes (i.e., the AP 6) was successful. The hash value HV1 in the received AP-SC and the hash value HV1 in the first printer-SC included in the stored first printer-CO matching means that the first printer-SC and the AP-SC were generated by the same device (i.e., the terminal 100). Thus, the printer 10 also determines that authentication of a generator of the received AP-SC (i.e., the terminal 100) was successful.

Further, the printer 10 decrypts the digital signature DSap1 in the received AP-SC by using the public key TPK2 of the terminal 100 included in the stored first printer-CO. In the case shown in FIG. 6, the decryption of the digital signature DSap1 is successful, so the printer 10 executes a second PR determination process related to whether the specific value obtained by decrypting the digital signature DSap1 matches the value obtained by hashing the respective pieces of information (i.e., the hash value HV1, the "Group1", and the public key APK2) in the received AP-SC. In the case shown in FIG. 6, the printer 10 determines a match in the second PR determination process, thus determines that the authentication of the respective pieces of information in the DRes was successful and executes processes from T414. The match being determined in the second PR determination process means that the respective pieces of information (i.e., the hash value HV1, the "Group1", and the public key APK2) in the AP-SC have not been tampered by a third party after the AP-CO was stored in the AP 6. On the other hand, the printer 10 determines that the authentication failed and does not execute the processes from T414 in each case where a match is not determined in the first PR determination process, the decryption of the digital signature DSap1 fails, and a match is not determined in the second PR determination process.

In T414, the printer 10 generates a connection key CK1 in conformity with the ECDH using the stored private key psk2 of the printer 10 and the public key APK2 of the AP 6 in the received AP-SC. Here, the connection key CK1 generated by the AP 6 in T404 and the connection key CK1 generated by the printer 10 in T414 match. Due to this, the connection keys CK1 for establishing the AP connection are shared between the printer 10 and the AP 6.

As aforementioned, after the connection keys CK1 have been shared between the printer 10 and the AP 6, the printer 10 and the AP 6 use the connection keys CK1 to execute the 4-way handshake communication in T420. As a result, the AP connection is established between the printer 10 and the AP 6. When T420 is completed, the process of FIG. 6 is terminated.

Auth Process of Printer 10; FIG. 7

An Auth process realized by the CPU 32 of the printer 10 will be described with reference to FIG. 7. Within the Auth process of FIG. 4, processes executed by the printer 10 are realized by the process of FIG. 7.

In S2, the CPU 32 monitors receipt of the AReq from a terminal that had captured the QR code of the printer 10 in the BS process (hereinafter termed "Initiator terminal") via the Wi-Fi I/F 16. The CPU 32 proceeds to S4 in a case of receiving the AReq from the Initiator terminal (YES to S2). The process of T210 of FIG. 4 is realized by the process of S2. All the communication in the process of FIG. 7 executed via the Wi-Fi I/F 16. Thus, hereinafter, the description "via the Wi-Fi I/F 16" will be omitted.

In S4, the CPU 32 determines whether the received AReq includes the MAC address "mac_ap". As indicated in T106 of FIG. 3, the AP-QR code in which the information including the MAC address "mac_ap" is encoded is displayed in the case where the "AP Communication" button is selected. Due to this, the Initiator terminal captures the AP-QR code, obtains the MAC address "mac_ap", and sends the AReq including the MAC address "mac_ap" to the printer 10. On the other hand, in the case where the "WFD Communication" button in the selection screen is selected, the WFD-QR code in which the information including the MAC address "mac_wfd" to be used in the WFD connection is encoded is displayed. Due to this, the Initiator terminal captures the WFD-QR code, obtains the MAC address "mac_wfd", and sends the AReq including the MAC address "mac_wfd" to the printer 10. The CPU 32 proceeds to S10 in a case of determining that the received AReq includes the MAC address "mac_ap" (YES to S4), while the CPU 32 proceeds to S20 in a case of determining that the received AReq includes the MAC address "mac_wfd" (NO to S4). Then, in the case of determining that the AReq includes the MAC address "mac_ap" (YES to S4), the printer 10 establishes the AP connection with one of the APs, while in the case of determining that the AReq includes the MAC address "mac_wfd", the printer 10 establishes the WFD connection with the Initiator terminal. Processes for establishing the WFD connection will be described later in FIGS. 12 to 15. According to this configuration, the printer 10 can establish a suitable Wi-Fi connection according to the MAC address included in the AReq.

In S10, the CPU 32 determines whether the AP information 44 is stored in the memory 34. The AP information 44 not being stored in the memory 34 means that no AP connection has been established between the printer 10 and any of the APs. The CPU 32 proceeds to S16 in a case of determining that no AP information 44 is stored in the memory 34 (NO to S10).

In S16, the CPU 32 determines the capability of the printer 10 as the "Enrollee".

Then, in S40, the CPU 32 executes processes similar to T212 to T218 of FIG. 4 (i.e., the authentication of the Initiator terminal and the generation of the encrypted data).

Then, in S42, the CPU 32 sends the ARes including the capability "Enrollee" to the Initiator terminal.

Then, in S44, the CPU 32 executes the Confirm process similar to T230 and T234 of FIG. 4. That it, the CPU 32 determines to operate as the Enrollee. When the process of S44 is completed, the process of FIG. 7 is terminated.

The AP information 44 being stored in the memory 34 means that the AP connection has been established between the printer 10 and one of the APs (such as the AP 6). The CPU 32 proceeds to S12 in a case of determining that the AP information 44 is stored in the memory 34 (YES to S10).

In S12, the CPU 32 determines whether the AReq received in S2 includes the value indicating a capability of the Initiator terminal as being capable of operating only as the Enrollee. A situation under which the received AReq includes the value indicating being capable of operating only as the Enrollee may for example be a situation under which a program that prioritizes execution of receipt of COs from other devices is installed in the Initiator terminal, or a situation under which an operation for selecting to receive the COs from other devices has been performed by the user on the initiator terminal. The CPU 32 proceeds to S14 in a case of determining that the received AReq includes the value indicating being capable of operating only as the Enrollee (YES to S12).

In S14, the CPU 32 determines the capability of the printer 10 as "Configurator". Following S30 is similar to S40.

Next, in S32, the CPU 32 sends the ARes including the capability "Configurator" to the Initiator terminal.

Then in S34, the CPU 32 executes the Confirm process. Unlike the Confirm process executed in S44, the CPU 32 determines to operate as the Configurator in the Confirm process of S34. When the process of S34 is completed, the process of FIG. 7 is terminated.

The CPU 32 proceeds to S16 in a case where the received AReq includes a value indicating being capable of operating as either the Configurator or the Enrollee, or in a case where the received AReq includes a value indicating being capable of operating only as the Configurator (NO to S12). That is, the CPU 32 determines the capability of the printer 10 as the "Enrollee". Then the processes of S40 to S44 are executed, and the process of FIG. 7 is terminated.

The CPU 32 executes the processes of S20 to S26 in the case of determining that the received AReq includes the MAC address "mac_wfd" (NO to S4). The printer 10 executes a G/O Negotiation to be described later and selects one of the G/O state and the CL state. The CPU 32 proceeds to S24 in a case where the printer 10 selected the G/O state as a result of the G/O Negotiation (YES to S20), while the CPU 32 proceeds to S26 in a case where the printer 10 selected the CL state as the result of the G/O Negotiation (NO to S20).

In S24, the CPU 32 determines the capability of the printer 10 as the "Configurator". Then, when S24 is completed, the CPU 32 executes the processes of S30 to S34 and terminates the process of FIG. 7.

In S26, the CPU 32 determines the capability of the printer 10 as the "Enrollee". Then, when S26 is completed, the CPU 32 executes the processes of S40 to S44 and terminates the process of FIG. 7.

For example, a comparative example may be assumed in which the determination of S10 (i.e., the determination on whether the AP information 44 is stored) is executed before the AReq is received from the Initiator terminal. For example, the printer 10 executes the determination of S10 in the BS process before the Auth process. In this comparative example, the printer 10 executes the determination of S10 where it is not necessary even in a case where the Auth process is not executed due to some reason (such as communication disruptions). Contrary to this, according to the configuration of the present embodiment, the printer 10 executes the determination of S10 in the case where the AReq is received from the Initiator terminal (YES to S2). According to the configuration of the present embodiment, the determination of S10 can be suppressed from being executed where it is not necessary. In a variant, the configuration of the comparative example may be employed.

Figure 8:
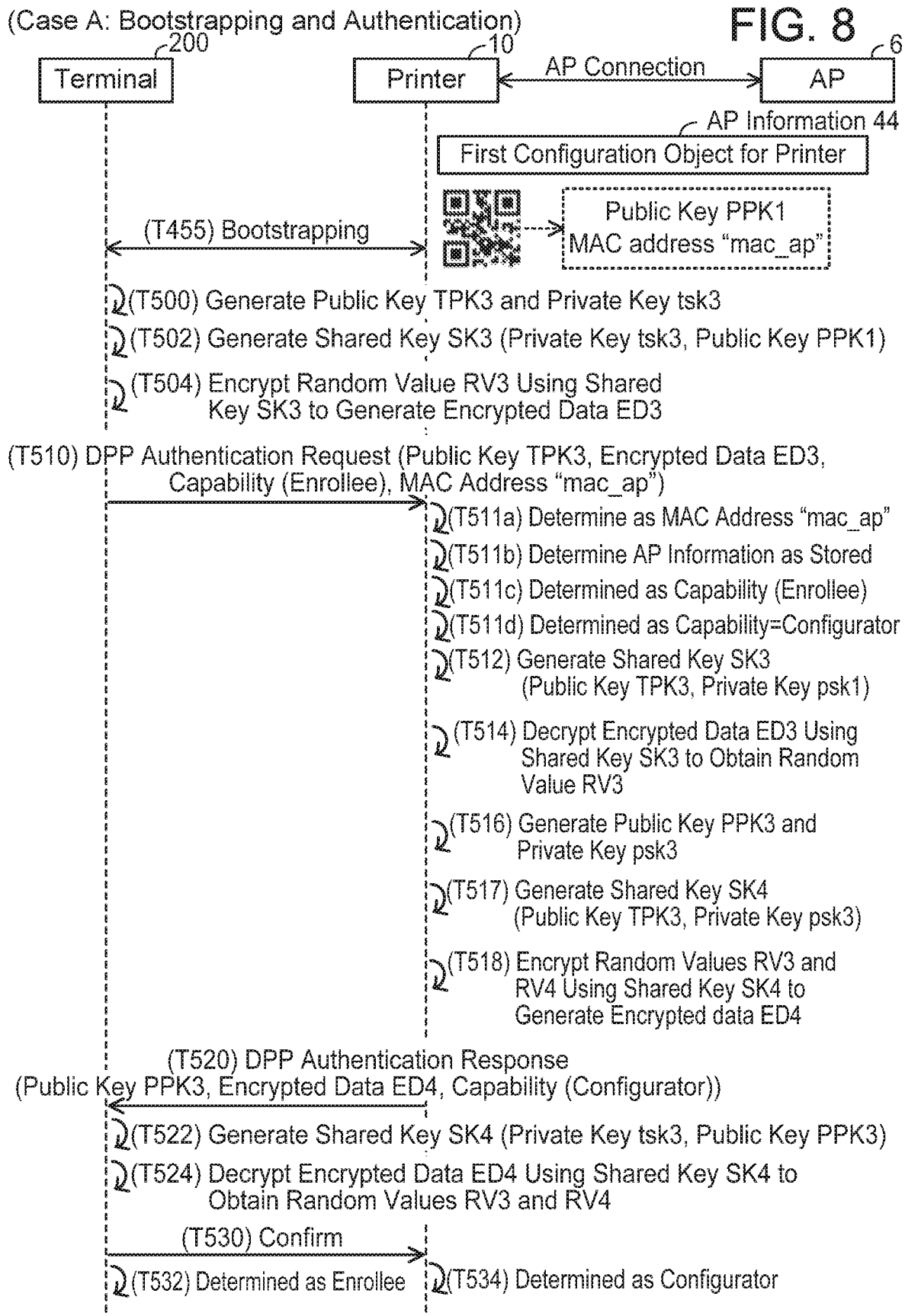
FIG. 8 shows a sequence diagram of the Bootstrapping process and the Authentication process in Case A in which a wireless connection is established between the printer and an AP.
Figure 9:
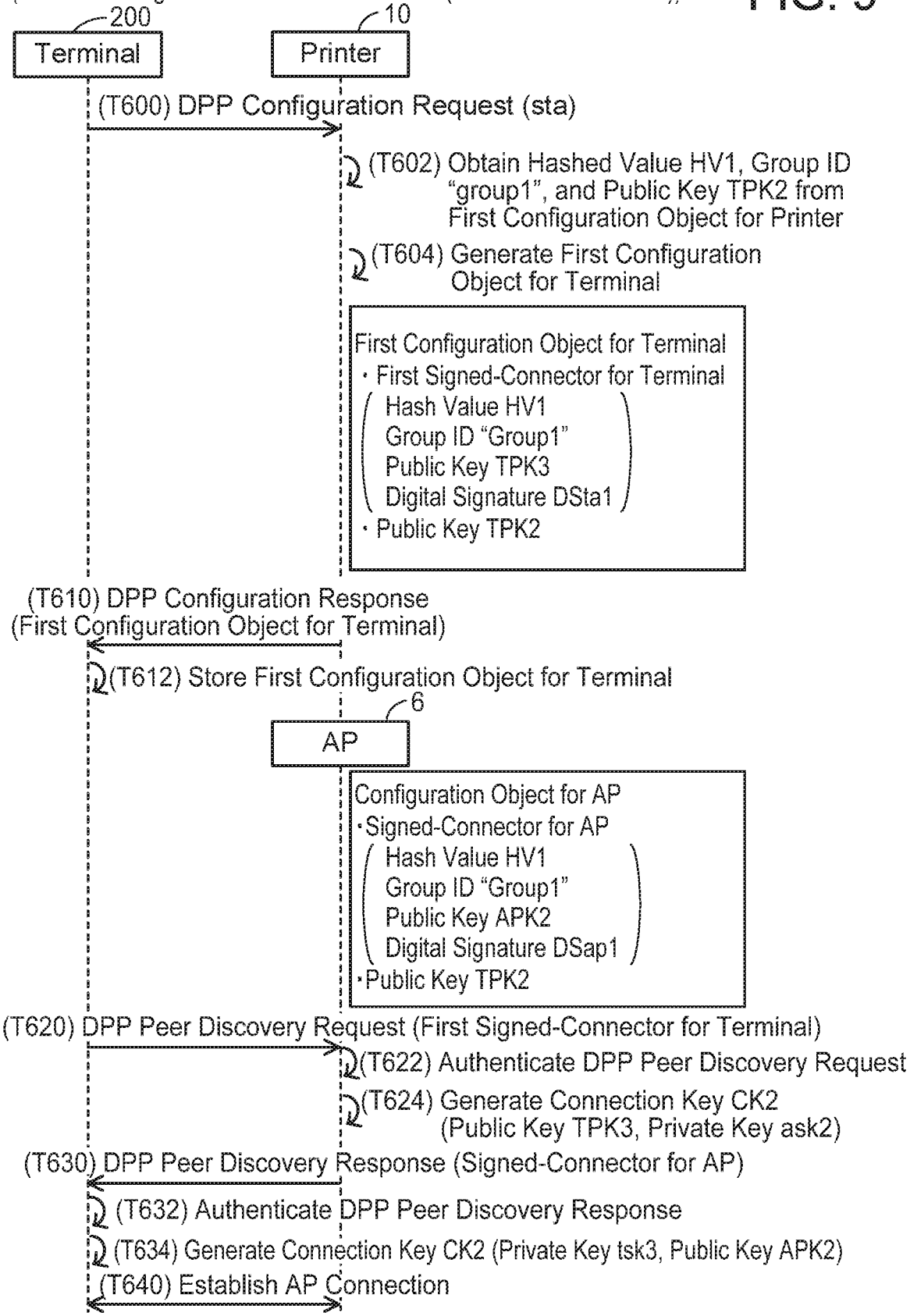
FIG. 9 shows a sequence diagram continued from FIG. 8 (Configuration process and Network Access process)

Specific Case A; FIGS. 8 and 9

Specific Case A realized by the process of FIG. 7 will be described with reference to FIGS. 8 and 9. Case A is a continuation of the process of FIG. 2 (i.e., FIGS. 3 to 6). That is, in an initial state of Case A, the AP connection is established between the printer 10 and the AP 6. Due to this, the first printer-CO is stored in the memory 34 of the printer 10 as the AP information 44 (see T312 of FIG. 5). Further, the terminal 200 does not have any AP connection established with any of the APs. In the present case, the AP connection between the terminal 200 and the AP 6 is established after having established the AP connection between the printer 10 and the AP 6. With the AP connection being established between the terminal 200 and the AP 6, the terminal 200 can participate as a child station in the wireless network formed by the AP 6 and thereby communicate with the printer 10 via the AP 6.

Bootstrapping (BS) and Authentication (Auth) in Case A; FIG. 8

The BS process and the Auth process in Case A will be described with reference to FIG. 8. T455 is similar to T25 of FIG. 2 (i.e., FIG. 3) except that the terminal 200 captures the AP-QR code of the printer 10.

In T500, the terminal 200 generates a public key TPK3 and a private key tsk3 of the terminal 200. T502 is similar to T202 of FIG. 4 except that a shared key SK3 is generated using the private key tsk3 of the terminal 200 and the public key PPK1 of the printer 10. T504 is similar to T204 of FIG. 4 except that encrypted data ED3 is generated by encrypting a random value RV3 using the shared key SK3.

In the present case, for example, the operation for selecting to receive COs from other devices has been performed on the terminal 200 by the user. Due to this, in T510, the terminal 200 sends the AReq including the value indicating being capable of operating only as the Enrollee as a capability of the terminal 200 to the printer 10. Further, this AReq includes the public key TPK3 of the terminal 200 generated in T500, the encrypted data ED3 generated in T504, and the MAC address "mac_ap".

Figure 7:
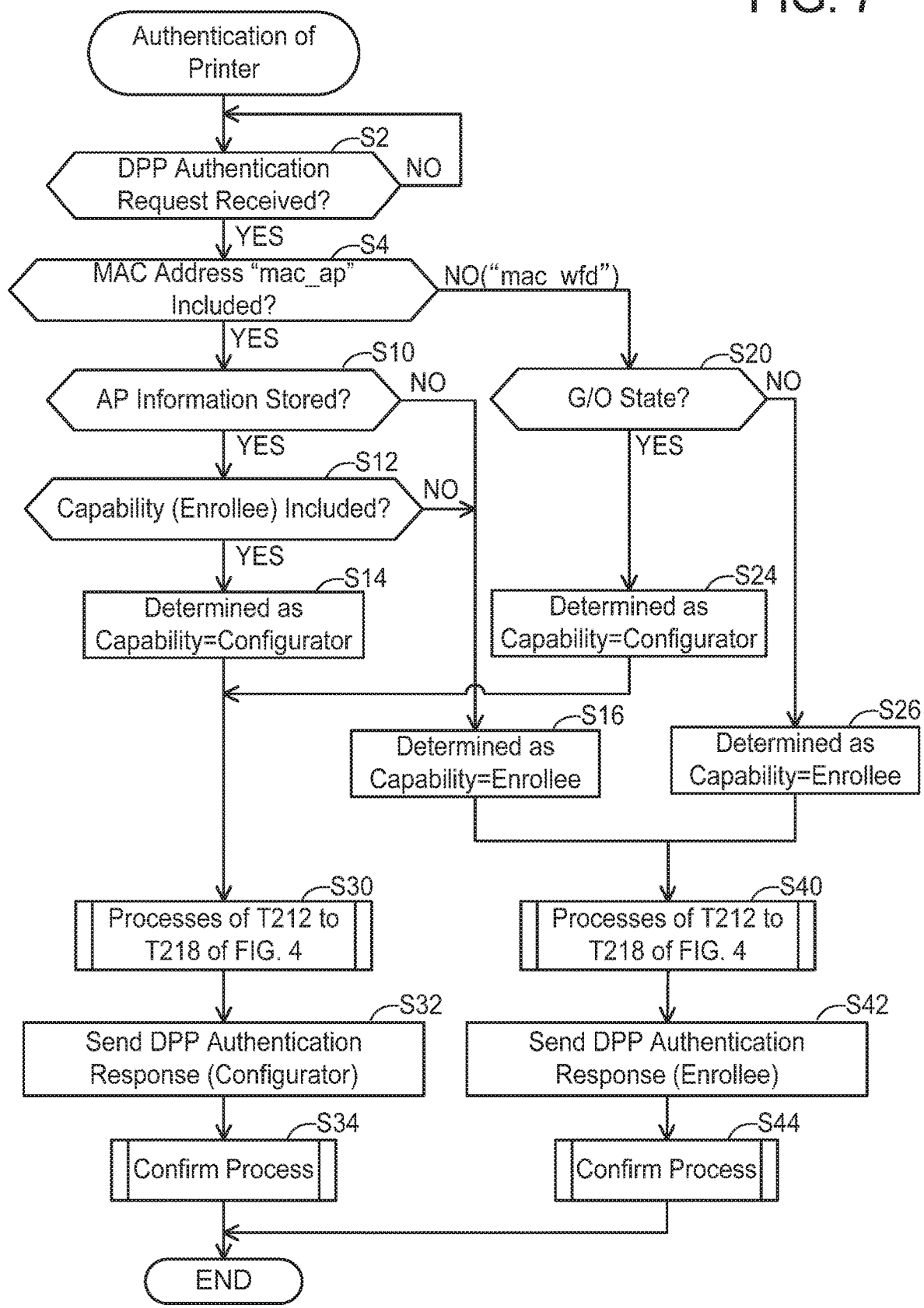
FIG. 7 shows a flowchart of the Authentication process.

When the AReq is received from the terminal 200 in T510, the printer 10 determines in T511a that the received AReq includes the MAC address "mac_ap" (YES to S4 of FIG. 7). In T511b, the printer 10 determines that the first printer-CO is stored in the memory 34 as the AP information 44 (YES to S10). In T511c, the printer 10 determines that the received AReq includes the value indicating being capable of operating only as the Enrollee as the capability of the terminal 200 (YES to S12). Then, in T511d, the printer 10 determines the capability of the printer 10 as the "Configurator" (S14).

Then, the printer 10 executes authentication similar to T212 to T218 of FIG. 4 and this authentication is completed successfully (S30). That is, the printer 10 generates the shared key SK3 using the public key TPK3 of the terminal 200 in the AReq and the private key psk1 of the printer 10 in T512, and decrypts the encrypted data ED3 in the AReq using the shared key SK3 and obtains the random value RV3 in T514. Then, the printer 10 generates a new public key PPK3 and a new private key psk3 of the printer 10 in T516, generates a shared key SK4 using the public key TPK3 of the terminal 200 in the AReq and the private key psk3 of the printer 10 in T517, and encrypts the random value RV3 and a new random value RV4 using the shared key SK4 and generates encrypted data ED4 in T518.

Then, in T520, the printer 10 sends the ARes including the public key PPK3 of the printer 10, the encrypted data ED4, and the capability of the printer 10 (i.e., the value indicating being capable of operating only as the Configurator) to the terminal 200 (S32).

When the ARes is received from the printer 10 in T520, the terminal 200 executes authentication similar to T222 and T224 of FIG. 4 and this authentication is completed successfully. That is, in T522, the terminal 200 generates a shared key SK4 using the private key tsk3 of the terminal 200 generated in T500 and the public key PPK3 of the printer 10 in the ARes, and decrypts the encrypted data ED4 in the ARes using the shared key SK4 and obtains the random values RV3 and RV4 in T524.

In T530, the terminal 200 sends the Confirm to the printer 10. The Confirm includes information indicating that the terminal 200 is to operate as the Enrollee and the printer 10 is to operate as the Configurator. As a result, the terminal 200 determines to operate as the Enrollee in T532 and the printer 10 determines to operate as the Configurator in T534.

Configuration (Config) and Network Access (NA) in Case A; FIG. 9

The Config process and the NA process in Case A will be described with reference to FIG. 9. That is, FIG. 9 is a continuation of FIG. 8. In the present case, the terminal 200 is the Enrollee. Due to this, in T600, the terminal 200 sends the CReq to the printer 10. The CReq in the present case includes the value "sta" hut docs not include the value "config".

When the CReq is received from the terminal 200 in T600, the printer 10 obtains the hash value HV1, the group ID "Group1", and the public key TPK2 from the first printer-CO being the AP information 44 in T602. Then, in T604, the printer 10 generates the first terminal-CO. Specifically, the printer 10 executes the following processes.

The printer 10 hashes a combination of the hash value HV1, the group ID "Group1", and the public key TPK3 of the terminal 200 in the AReq in T510 of FIG. 8 to generate a specific value. Then, the printer 10 generates a digital signature DSta1 in conformity with the ECDSA using the private key tsk2 included in the operation information received from the terminal device 100 in T310 of FIG. 5 to encrypt the generated specific value. As a result, the printer 10 can generate a first terminal-SC for a terminal including the hash value HV1, the group ID "Group1", the public key TPK3 of the terminal 200, and the digital signature DSta1. Then, the printer 10 generates the first terminal-CO including the first terminal-SC and the public key TPK2.

In T610, the printer 10 sends the CRes including the first terminal-CO to the terminal 200. Due to this, the terminal 200 obtains the first terminal-CO and stores the first terminal-CO in T612.

Then, the terminal 200 sends the DReq including the first terminal-SC to the AP 6 in T620.

When the DReq is received from the terminal 200 in T620, the AP 6 executes authentication of the DReq in T622 similar to T402 of FIG. 6. In the case shown in FIG. 9, the hash value HV1 and the group ID "Group1" in the received first terminal-SC respectively match the hash value HV1 and the group ID "Group1" in the AP-SC included in the stored AP-CO, so the AP 6 determines that the authentication was successful in the first AP determination process.

The AP 6 further decrypts the digital signature DSta1 in the received first terminal-SC using the public key TPK2 included in the stored AP-CO. In the case shown in FIG. 9, the decryption of the digital signature DSta1 is completed successfully. In this case, the specific value obtained by decrypting the digital signature DSta1 and the value obtained by hashing the respective pieces of information (i.e., the hash value HV1, the "Group1", and the public key TPK3) in the received first terminal-SC match, thus the AP 6 determines that the authentication was successful in the second AP determination process.

Next, in T624, the AP 6 generates a connection key CK2 in conformity with the ECDH using the obtained public key TPK3 of the terminal 200 and the stored private key ask2 of the AP 6. In T630, the AP 6 sends the DRes including the AP-SC to the terminal 200.

When the DRes is received from the AP 6 in T630, the terminal 200 executes authentication of the DRes in T632 similar to T412 of FIG. 6. The terminal 200 firstly executes a first TA determination process that is similar to the first PR determination process. In the case shown in FIG. 9, since the hash value HV1 and the group ID "Group1" in the received AP-SC respectively match the hash value HV1 and the group ID "Group1" in the first terminal-SC included in the stored first terminal-CO, the terminal 200 determines that the authentication was successful in the first TA determination process.

Then, the terminal 200 executes a second TA determination process that is similar to the second PR determination process. Specifically, the terminal 200 decrypts the digital signature DSap1 in the received AP-SC using the public key TPK2 included in the stored first terminal-CO. In the present case, the terminal 200 determines that the specific value obtained by decrypting the digital signature DSap1 and the value obtained by hashing the respective pieces of information (i.e., the hash value HV1, the "Group1", and the public key APK2) in the received AP-SC match, thus the terminal 200 determines that the authentication was successful in the second TA determination process.

Then, in T634, the terminal 200 generates a connection key CK2 in conformity with the ECDH using the stored private key tsk3 of the terminal 200 and the obtained public key APK2 of the AP 6. By doing so, the terminal 200 and the AP 6 establish the AP connection using the connection keys CK2 in T640.

Figure 10:
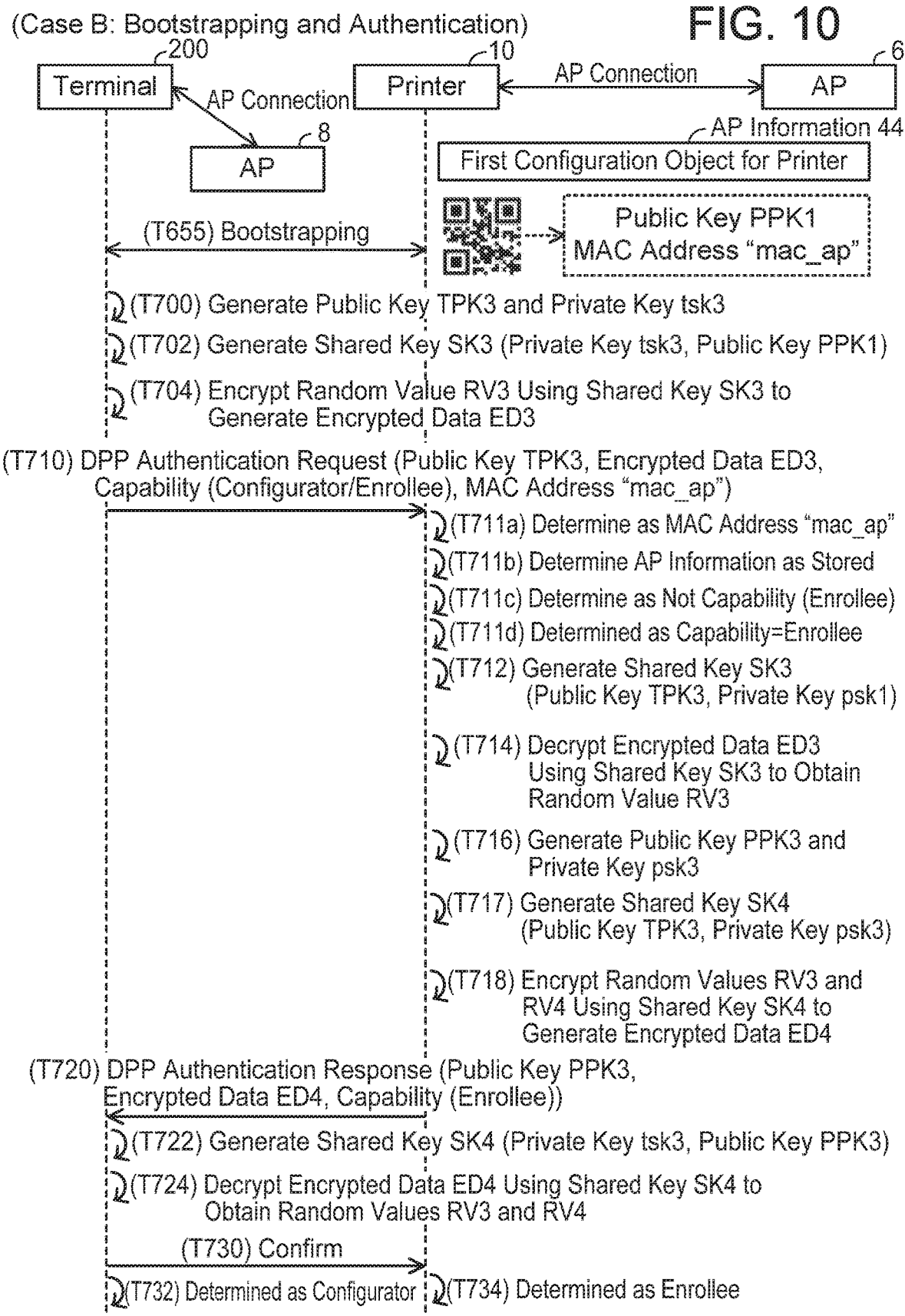
FIG. 10 shows a sequence diagram of the Bootstrapping process and the Authentication process in Case B in which wireless connections are established between the printer and an AP and between a terminal and another AP.
Figure 11:
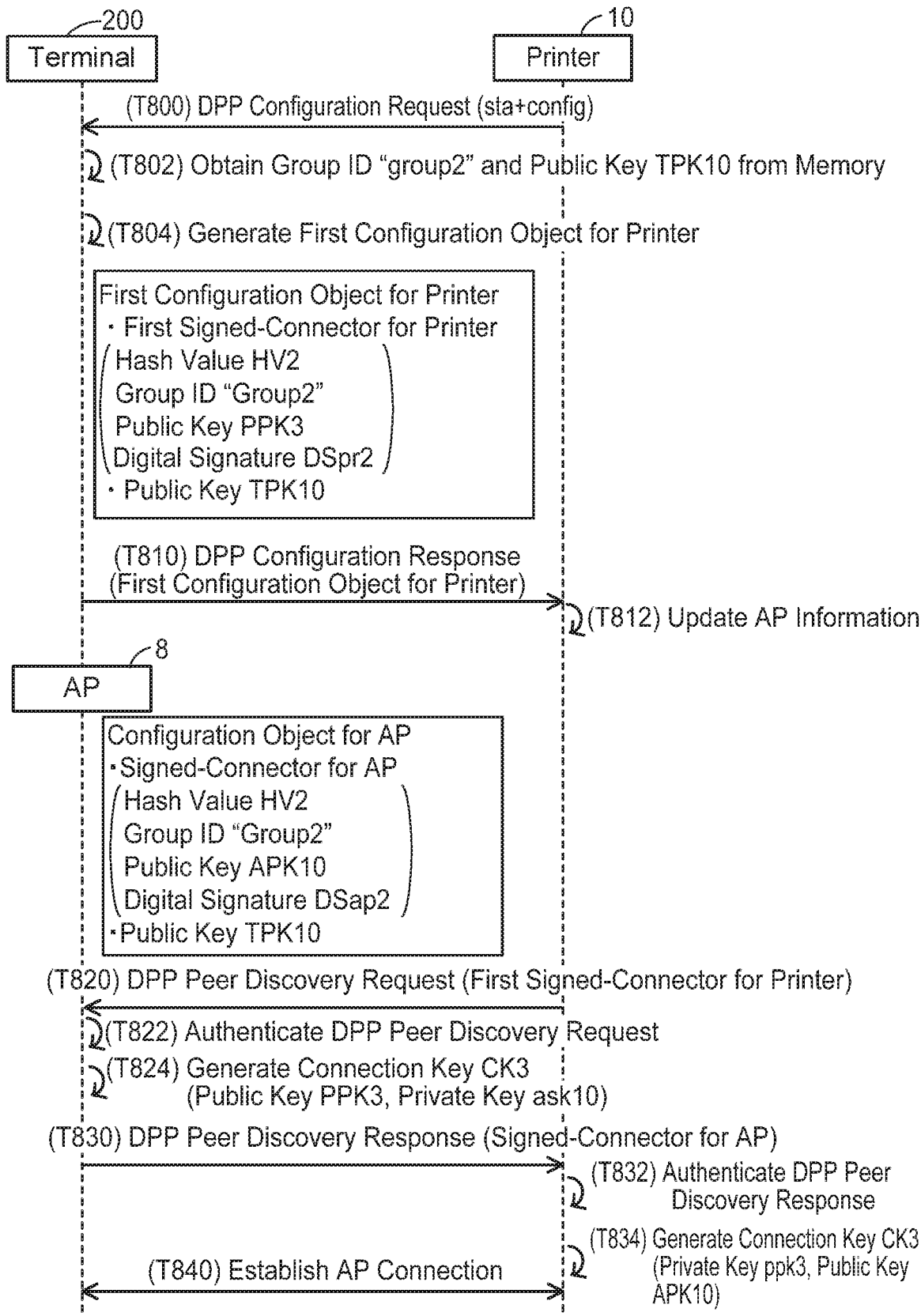
FIG. 11 shows a sequence diagram continued from FIG. 10 (Configuration process and Network Access process)

Specific Case B; FIGS. 10 and 11

Specific Case B realized by the process of FIG. 7 will be described with reference to FIGS. 10 and 11. Case B is a continuation of the process of FIG. 2 (i.e., FIGS. 3 to 6), similar to Case A. That is, in an initial state of Case B, the AP connection is established between the printer 10 and the AP 6. Further, the terminal 200 has the AP connection established with the AP 8. In the present case, a new AP connection is to be established between the printer 10 and the AP 8 by the respective devices 8, 10, 200 executing communication in conformity with the DPP scheme. By doing so, the printer 10 can be shifted to a state of being connected to the AP 8 from a state oi being connected to the AP 6.

Bootstrapping (BS) and Authentication (Auth) in Case B: FIG. 10

The BS process and the Auth process in Case B will be described with reference to FIG. 10. T655 is similar to T455 of FIG. 8. T700 to T704 are similar to T500 to T504 of FIG. 8.

In the present case, the operation for selecting to receive CO(s) from other device(s) has not been performed on the terminal 200 by the user. Due to this, in T710, the terminal 200 sends the AReq including the value indicating being capable of operating as either the Configurator or the Enrollee as the capability of the terminal 200 to the printer 10. T710 is similar to T510 of FIG. 8 except that the value of the capability of the terminal 200 is different.

T711a and T711b are similar to T511a and T511b of FIG. 8. In T711c, the printer 10 determines that the received AReq docs not include the value indicating being capable of operating only as the Enrollee as the capability of the terminal 200 (NO to S12). Then, in T711d, the printer 10 determines the capability of the printer 10 as the "Enrollee" (S16).

T712 to T718 are similar to T512 to T518 of FIG. 8. T720 is similar to T520 of FIG. 8 except that the ARes includes the value indicating being capable of operating only as the Enrollee as the capability of the printer 10.

T722 and T724 are similar to T522 and T524 of FIG. 8. T730 is similar to T530 of FIG. 8 except that the Confirm includes information indicating that the terminal 200 is to operate as the Configurator and the printer 10 is to operate as the Enrollee. As a result, the terminal 200 determines to operate as the Configurator in T732 and the printer 10 determines to operate as the Enrollee in T734.

Configuration (Config) and Network Access (NA) in Case B; FIG. 11

The Config process and the NA process in Case B will be described with reference to FIG. 11. That is, FIG. 11 is a continuation of FIG. 10. In the present case, the printer 10 is the Enrollee. Due to this, in T800, the printer 10 sends the CReq to the terminal 200. The CReq in the present case includes the value "sta" and the value "config".

When the CReq is received from the printer 10 in T800, the terminal 200 obtains a group ID "Group2", a public key TPK10, and a private key tsk10 from a memory (not shown) of the terminal 200 in T802. In the present case, the AP connection is established between the terminal 200 and the AP 8. That is, the terminal 200 has already executed the Config in conformity with the DPP scheme with the AP 8, upon having done so, the group ID "Group2", the public key TPK10, and the private key tsk10 were generated and stored in the memory. That is, in T802, the terminal 200 obtains the respective pieces of information stored in the Config. Then, in T804, the terminal 200 generates the first printer-CO. Specifically, the terminal 200 generates a hash value HV2 by hashing the public key TPK10 of the terminal 200. Further, the terminal 200 generates a specific value by hashing a combination of the bash value HV2, the group ID "Group2", and the public key PPK3 of the printer 10 in the ARes in T720 of FIG. 10. Then, the terminal 200 encrypts the generated specific value using the private key tsk10 of the terminal 200 and generates a digital signature DSpr2. As a result, the terminal 200 generates the first printer-SC including the hash value HV2, the group ID "Group2", the public key PPK3 of the printer 10, and the digital signature DSpr2. Then, the terminal 200 generates the first printer-CO including the first printer-SC and the public key TPK10 of the terminal 200.

In T810, the terminal 200 sends the CRes including the first printer-CO to the printer 10. Due to this, in T812, the printer 10 stores the first printer-CO received in T810 as the AP information 44 by replacing the first printer-CO already stored as the AP information 44 (i.e., the first printer-CO used in the AP connection with the AP 6). That is, it updates the AP information 44.

As aforementioned, in the present case, the AP connection is already established between the terminal 200 and the AP 8. Due to this, the AP 8 stores a public key APK10 and a private key ask10 of the AP 8, and further stores the AP-CO received from the terminal 200. The AP-CO includes the AP-SC and the public key TPK10 of the terminal 200. Further, the AP-SC includes the hash value HV2, the group ID "Group2", the public key APK10 of the AP 8, and a digital signature DSap2. The digital signature DSap2 is information in which the specific value obtained by hashing a combination of the hash value HV2, the group ID "Group2", and the public key APK10 is encrypted using the private key tsk10 of the terminal 200, and is a value that is different from the digital signature DSpr2 included in the first printer-CO.

T820 to T834 are similar to T400 to T414 of FIG. 6 primarily except that the communication is executed between the AP 8 and the printer 10 and that a connection keys CK3 are generated using the public key PPK3 and the private key ask10 (and the private key psk3 and the public key APK10). Due to this, the printer 10 and the AP 8 establish the AP connection in T840 using the connection keys CK3.

Specific Case C; FIGS. 12 to 15

Specific Case C realized by the process of FIG. 7 will be described with reference to FIGS. 12 to 15. Case C is a continuation of the process of FIG. 2 (i.e., FIGS. 3 to 6), similar to Case A. That is, in an initial state of Case C, the AP connection is established between the printer 10 and the AP 6. In the present case, the WFD connection is to be established between the printer 10 and the terminal 200 by the "WFD Communication" button being selected by the user.

Figure 12:
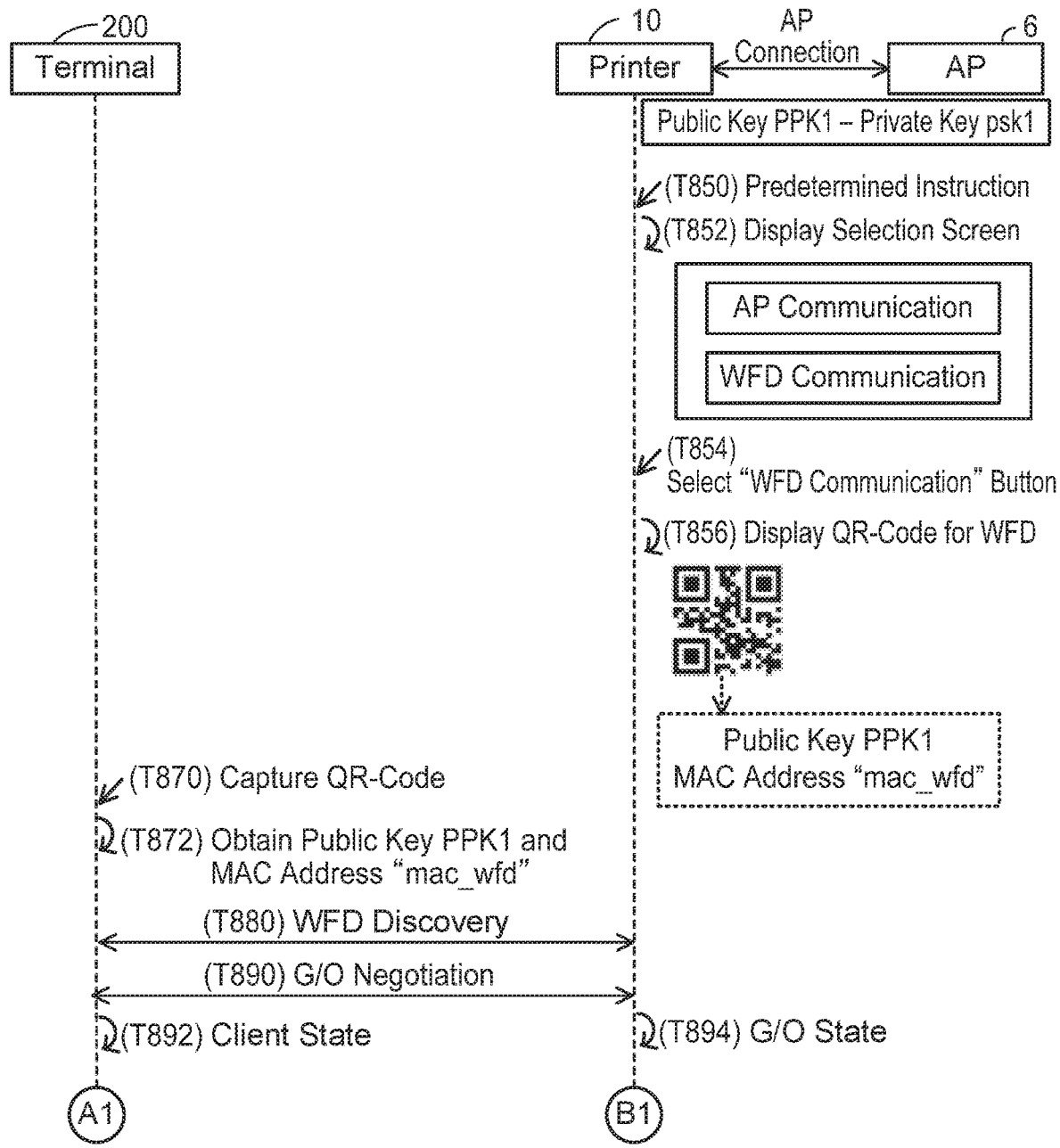
FIG. 12 shows a sequence diagram of the Bootstrapping process in Case C in which a wireless connection in conformity with a WFD scheme is to be established between the printer and a terminal.

Bootstrapping (BS) in Case C; FIG. 12

The BS process in Case C will be described with reference to FIG. 12. T850 and T852 are similar to T100 and T102 of FIG. 3. In T854, the user operates the operation unit 12 and selects the "WFD Communication" button in the selection screen. T856 is similar to T106 of FIG. 3 except that a WFD-QR code is displayed on the display unit 14. The WFD-QR code is obtained by encoding the public key PPK1 of the printer 10 and the MAC address "mac_wfd" used in the WFD connection.

T870 and T872 are similar to T120 and T122 of FIG. 3 except that the WFD-QR code is captured by the terminal 200 and the MAC address "mac_wfd" is obtained by the terminal 200.

Next, in T880, the terminal 200 and the printer 10 execute WFD Discovery communication in conformity with the WFD scheme. The WFD Discovery is communication for searching for the printer 10.

Next, in T890, the terminal 200 anti the printer 10 execute G/O Negotiation communication in conformity with the WFD scheme. The G/O Negotiation is communication for determining which device is to operate in the G/O state or the CL state. In the present case, it is determined that the printer 10 is to be in the G/O state and the terminal 200 is to be in the CL state. As a result, the terminal 200 enters the CL state in T892 and the printer 10 enters the G/O state in T894. For example, which one of the printer 10 and the terminal 200 is to be in the G/O state is determined according to various factors such as a spec of the printer 10 or the terminal 200. In the present embodiment, the printer 10 enters the G/O state when the AP connection is established between the printer 10 and one of the APs, and the printer 10 enters the CL state when there is no AP connection established between the printer 10 and any of the APs. In a variant, it may be determined that the terminal 200 is to be in the G/O state and the printer 10 is to be in the CL state.

Figure 13:
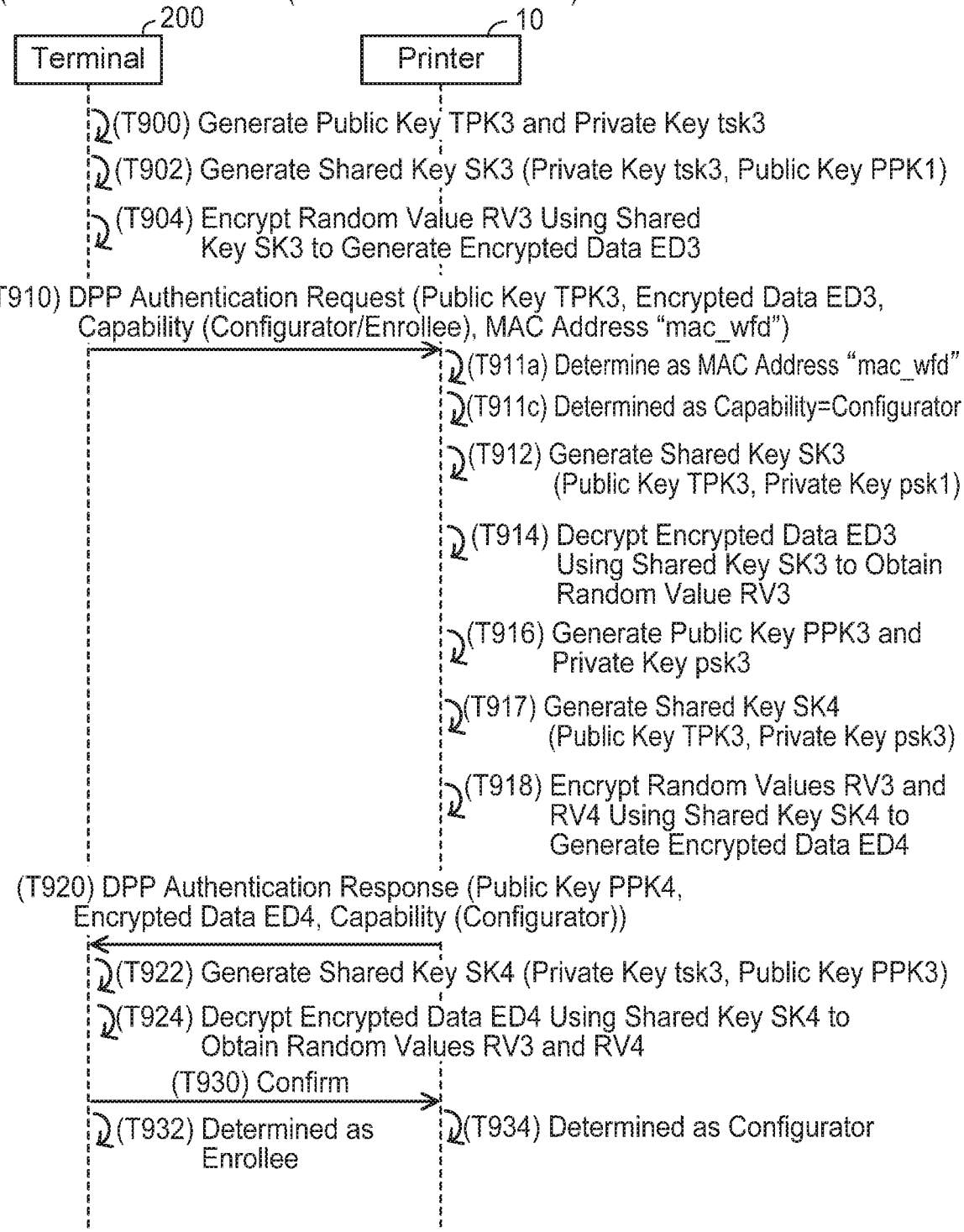
FIG. 13 shows a sequence diagram continued from FIG. 12 (Authentication process)

Authentication (Auth) in Case C; FIG. 13

The Auth process in Case C will be described with reference to FIG. 13. That is, FIG. 13 is a continuation of FIG. 12. T900 to T904 are similar to T500 to T504 of FIG. 8. T910 is similar to T510 of FIG. 8 except that the AReq includes the value indicating being capable of operating as either the Configurator or the Enrollee as the capability of the terminal 200 and the MAC address "mac_wfd".

When the AReq is received from the terminal 200 in T910, the printer 10 determines in T911a that the received AReq includes the MAC address "mac_wfd" (NO to S4 of FIG. 7). In T911c, the printer 10 determines the capability of the printer 10 as the "Configurator" (S24) since the printer 10 is in the G/O state (YES to S20). T912 to T934 are similar to T512 to T534 of FIG. 8.

Figure 14:
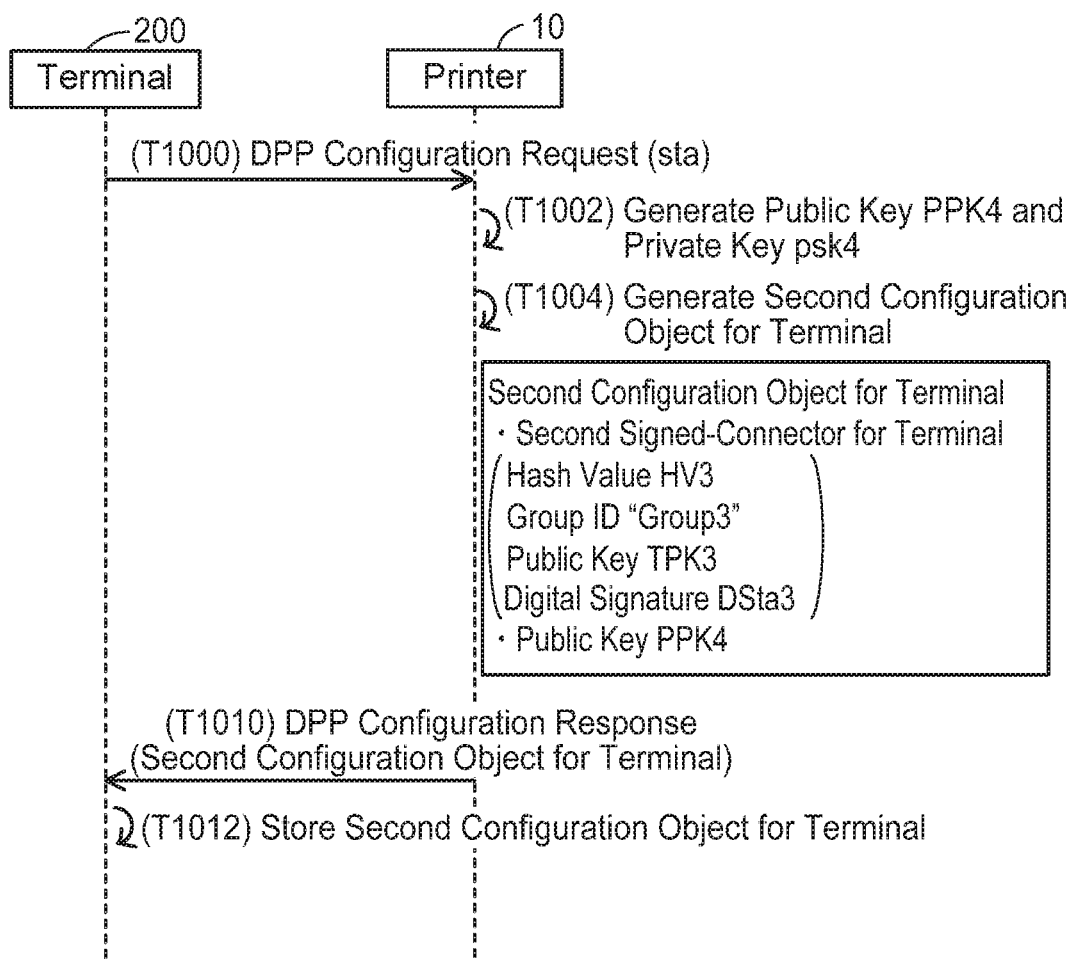
FIG. 14 shows a sequence diagram continued from FIG. 13 (Configuration process)

Configuration (Config) in Case C; FIG. 14

The Config process in Case C will be described with reference to FIG. 14. That is, FIG. 14 is a continuation of FIG. 13. T1000 is similar to T600 of FIG. 9.

In T1002, the printer 10 generates a public key PPK4 and a private key psk4 of the printer 10. Then, in T1004, the printer 10 generates a second terminal-CO for a terminal. Specifically, printer 10 executes the following processes.

Firstly, the printer 10 generates a hash value HV3 by hashing the public key PPK4 of the printer 10. Further, the printer 10 generates a specific value by hashing a combination of the hash value HV3, a group ID "Group3", and the public key TPK3 of the terminal 200 in the AReq of T910 of FIG. 13. Then, the printer 10 generates a digital signature DSta3 by using the private key psk4 to encrypt the generated specific value in conformity with the ECDSA. As a result, the printer 10 can generate a second terminal-SC for a terminal including tbc hash value HV3, the group ID "Group3", the public key TPK3 of the terminal 200, and the digital signature DSta3. Then, the printer 10 generates the second terminal-CO including the second terminal-SC and the public key PPK4.

In T1010, the printer 10 sends the CRes including the second terminal-CO to the terminal 200. Due to this, the terminal 200 obtains the second terminal-CO and stores the second terminal-CO in T1012.

Figure 15:
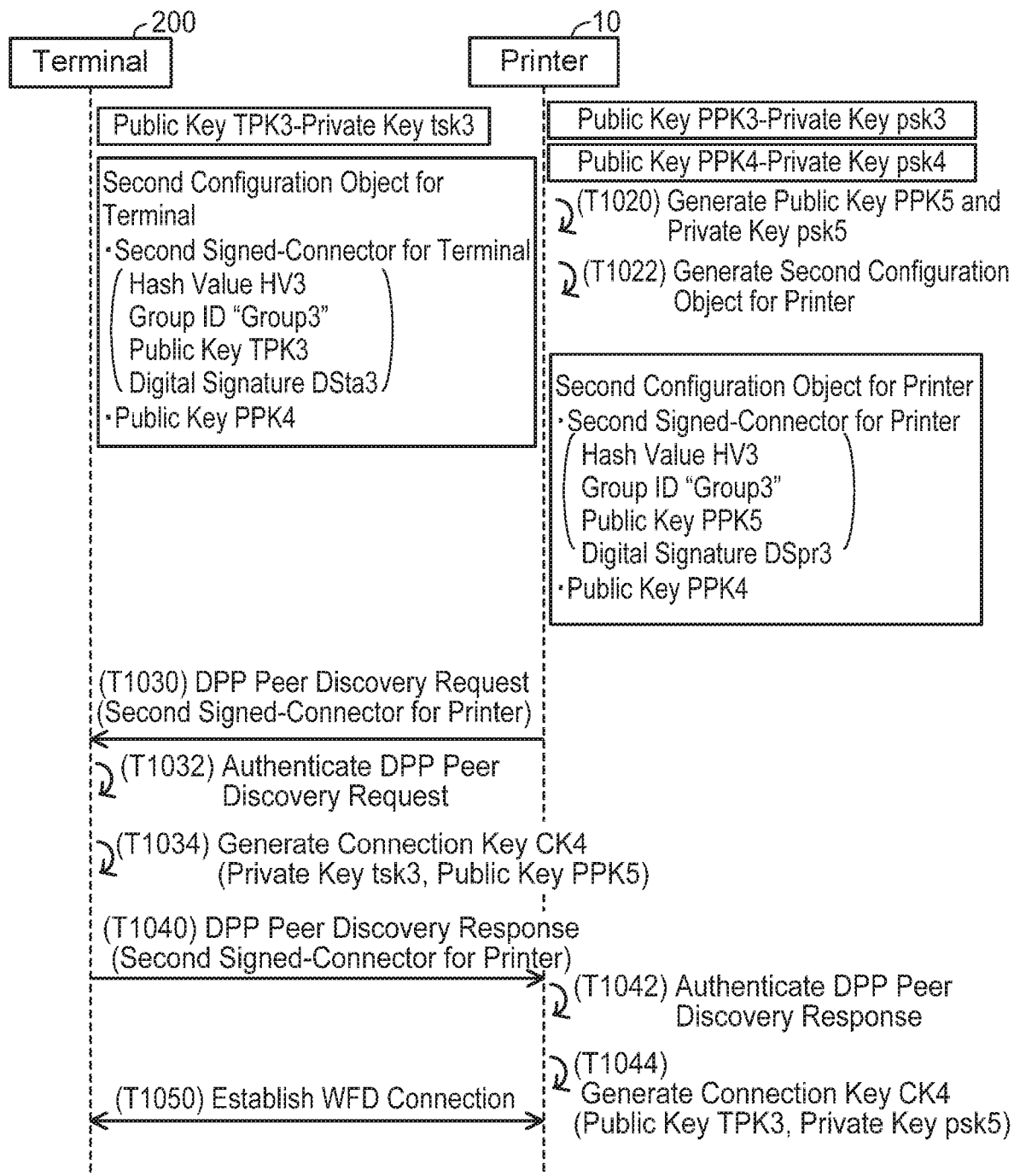
FIG. 15 shows a sequence diagram continued from FIG. 14 (Network Access process)

Network Access (NA) in Case C; FIG. 15

The NA process in Case C will be described with reference to FIG. 15. That is, FIG. 15 is a continuation of FIG. 14.

In T1020, the printer 10 generates a public key PPK5 and a private key psk5 of the printer 10. Then, in T1022, the printer 10 generates a second printer-CO. Specifically, the printer 10 executes the following processes.

The printer 10 generates a specific value by hashing a combination of the hash value HV3, the group ID "Group3", and the public key PPK5 generated in T1020. Then, the printer 10 generates a digital signature DSpr3 by using the private key psk4 to encrypt the generated specific value in conformity with the ECDSA. As a result, the printer 10 can generate a second printer-SC for a printer including the hash value HV3, the group ID "Group3", the public key PPK5 of the printer 10, and the digital signature DSpr3. Then, the printer 10 generates the second terminal-CO including the second printer-SC and the public key PPK4.

In T1030, the printer 10 sends the DReq including the second printer-SC to the terminal 200.

When the DReq is received from the printer 10 in T1030, the terminal 200 executes authentication of the DReq in T1032 similar to T402 of FIG. 6. Specifically, the terminal 200 determines that the hash value HV3 and the group ID "Group3" in the received second printer-SC respectively match the hash value HV3 and the group ID "Group3" in the stored second terminal-SC. Then, the terminal 200 decrypts the digital signature DSpr3 in the received second printer-SC using the public key PPK4 in the stored second terminal-CO. The terminal 200 determines that the specific value obtained by decrypting the digital signature DSpr3 and the value obtained by hashing the respective pieces of information (i.e., the hash value HV3, the "Group3", and the public key PPK5) in the received second printer-SC match. Due to the above, the terminal 200 determines that the authentication of the DReq was successful.

Next, in T1034, the terminal 200 generates a connection key CK4 in conformity with the ECDH using the stored private key tsk3 of the terminal 200 and the obtained public key PPK5 of the printer 10. In T1040, the terminal 200 sends the DRes including the second terminal-SC to the printer 10.

When the DRes is received from the terminal 200 in T1040, the printer 10 executes authentication of the DRes in T1042 similar to T412 of FIG. 6. Specifically, the printer 10 determines that the hash value HV3 and the group ID "Group3" in the received second terminal-SC match the hash value HV3 and the group ID "Group3" in the stored second printer-SC. Then, the printer 10 decrypts the digital signature DSta3 in the received second terminal-SC using the public key PPK4 in the stored second printer-CO. The printer 10 determines that the specific value obtained by decrypting the digital signature DSta3 and the value obtained by hashing the respective pieces of information (i.e., the hash value HV3, the "Group3" and the public key TPK3) in the received second terminal-SC match. Due to the above, the printer 10 determines that the authentication of the DRes was successful.

Next, in T1044, the printer 10 generates a connection key CK4 in conformity with the ECDH using the obtained public key TPK3 of the terminal 200 and the stored private key psk5 of the printer 10. Due to this, the printer 10 and the terminal 200 establish the WFD connection in T1050 using the connection keys CK4.

Table Summarizing Respective Cases in the Present Embodiment; FIG. 16

Cases realized by the Auth process of the printer 10 in FIG. 7 will be described with reference to FIG. 16. As shown in the respective cases with line numbers 1 to 8 of FIG. 16, the capability of the printer 10 is determined.

The cases with line numbers 1 to 4 indicate cases in which the AP connection is established between one of the terminals having captured the QR code of the printer 10 (i.e., the "Initiator terminal") and one of the APs (such as the AP 6) in the BS process.

The case with the line number 1 shows a case in which the AP connection is not established between the printer 10 and any of the APs (such as the AP 6) and the "AP Communication" button is selected in the selection screen displayed in the printer 10 (see T102 of FIG. 3). This case corresponds to the case of FIGS. 2 to 6. That is, the printer 10 establishes the AP connection with the AP 6 under the situation where the AP connection is established between the Initiator terminal and the AP 6. In this case, the printer 10 determines that the AReq includes the MAC address "mac_ap" (YES to S4 of FIG. 7) and determines that the AP information 44 is not stored in the memory 34 (NO to S10). As a result, the printer 10 determines the capability of the printer 10 as the "Enrollee" (S16). In the present case, the printer 10 can receive the CO from the Initiator terminal and participate as a child station in the wireless network in which the Initiator terminal is currently participating.

The case with the line number 2 shows a case in which the AP connection is not established between the printer 10 and any of the APs and the "WFD Communication" button is selected in the selection screen. This case corresponds to a case of establishing the WFD connection between the printer 10 and the Initiator terminal. In this case, the printer 10 determines that the AReq includes the MAC address "mac_wfd" (NO to S4 of FIG. 7). Since the AP connection is not established between the printer 10 and any of the APs, the printer 10 enters the CL state (NO to S20). As a result, the printer 10 determines the capability of the printer 10 as the "Enrollee" (S26). In the present case, the printer 10 can execute communication with the Initiator terminal in conformity with the WFD scheme in response to the "WFD Communication" button being selected.

The case with the line number 3 shows a case in which the AP connection is established between the printer 10 and the AP 6 and the "AP Communication" button is selected in the selection screen. This case corresponds to Case B of FIGS. 10 and 11. That is, it corresponds to a case in which the printer 10 is shifted to the state of being connected to the AP 8 from the state of being connected to the AP 6 in a situation where the AP connection is established between the Initiator terminal and the AP 8. In this case, the printer 10 determines the capability of the printer 10 as the "Enrollee" (T711a to T711d of FIG. 10 and S16 of FIG. 7).

The case with the line number 4 shows a case in which the AP connection is established between the printer 10 and one of the APs and the "WFD Communication" button is selected in the selection screen. This case corresponds to a case in which, the WFD connection is established between the printer 10 and the initiator terminal although the AP connection is established between the Initiator terminal and the one of the APs. In this case, the printer 10 determines that the AReq includes the MAC address "mac_wfd" (NO to S4 of FIG. 7). Since the AP connection is established between the printer 10 and the one of the APs, the printer 10 enters the G/O state (YES to S20). As a result, the printer 10 determines the capability of the printer 10 as the "Configurator" (S24). In the present case, the printer 10 can execute communication via the AP, however, it can execute communication with the Initiator terminal in conformity with the WFD scheme from a viewpoint of security.

Further, cases with the line numbers 5 to 8 show cases in which the AP connection is not established between the Initiator terminal and any of the APs (such as the AP 6).

The case with the line number 5 is similar to the case with the line number 1 except that the AP connection is not established between the Initiator terminal and any of the APs. In this case, the printer 10 establishes the AP connection with the AP 6 under the situation in which the AP connection is not established between the Initiator terminal and the AP 6. For example, the AP connection is also established between the Initiator terminal and the AP 6 by the Initiator terminal capturing the QR code adhered to the AP 6 after the AP connection has been established between the printer 10 and the AP 6. In this case, the printer 10 determines the capability of the printer 10 as the "Enrollee" (S16 of FIG. 7). In the present case, both the primer 10 and the Initiator terminal can be participated in the wireless network formed by the AP.

The case with the line number 6 is similar to the case with the line number 2 except that the AP connection is not established between the Initiator terminal and any of the APs. In this case, the printer 10 determines the capability of the printer 10 as the "Enrollee" (S26 of FIG. 7). In the present case, the printer 10 can execute communication with the Initiator terminal in conformity with the WFD scheme under a situation in which neither the printer 10 nor the Initiator terminal has a Wi-Fi connection established with any of the APs.

The case with the line number 7 is similar to the case with the line number 3 except that the AP connection is not established between the Initiator terminal and any of the APs. This case corresponds to Case A of FIGS. 8 and 9. That is, the Initiator terminal establishes the AP connection with the AP 6 under the situation in which the AP connection is not established between the Initiator terminal and any of the APs while the AP connection is established between the printer 10 and the AP 6. In this case, the printer 10 determines the capability of the printer 10 as the "Configurator" (T511a to T511d of FIG. 8 and S14 of FIG. 7). In the present case, the printer 10 can send the CO to the initiator terminal and cause the Initiator terminal to participate as a child station in the wireless network in which the printer 10 is currently participating.

The case with the line number 8 is similar to the case with the line number 4 except that the AP connection is not established between the Initiator terminal and any of the APs. This case corresponds to Case C of FIGS. 12 to 15. That is, the printer 10 establishes the WFD connection with the Initiator terminal although the AP connection is established between the printer 10 and one of the APs. In this case, the printer 10 determines the capability of the printer 10 as the "Configurator" (T911a and T911c of FIG. 13 and S24 of FIG. 7). In the present case, the primer 10 can execute communication via the AP, however, it can execute communication with the Initiator terminal in conformity with the WFD scheme from the viewpoint of security.

Effects of the Present Embodiment

According to the configurations of the present embodiment, the printer 10 determines whether the AP information 44 is stored in the memory 34, that is, whether the AP connection has been established between the printer 10 and any one of the access points (S10 of FIG. 7). Under the situation in which the AP connection has been established between the printer 10 and the AP 6 (YES to S10), the printer 10 serves the role of the Configurator (S14) and sends the first terminal-CO to the terminal 200 (T610 of FIG. 9 and the case with the line number 7 in FIG. 16). As a result, the AP connection can be established between the terminal 200 and the AP 6 (T640). Further, under the situation in which no AP connection has been established between the printer 10 and any of the access points (NO to S10), the primer 10 serves the role of the Enrollee (S16) and receives the first printer-CO from the terminal 100 (T310 of FIG. 5 and the case with the line number 1 in FIG. 16). As a result, the AP connection can be established between the primer 10 and the AP 6. Thus, the printer 10 can serve a suitable role by determining the situation of the printer 10 itself.

Further, under the situation in which the AP connection has been established between the primer 10 and any one of the access points, the printer 10 determines whether the AReq includes the value indicating being capable of operating only as the Enrollee as the capability of the Initiator terminal (S12 of FIG. 7). In the case of determining that the AReq includes such value (YES to S12 of FIG. 7), the printer 10 serves the role of the Configurator (S14 and the case with the line number 7 in FIG. 16). On the other hand, in the case of determining that the AReq does not include such value (NO to S12 of FIG. 7), the printer 10 serves the role of the Enrollee (S16 and the case with the line number 3 in FIG. 16). According to this configuration, the printer 10 can serve a suitable role by determining both the situation of the printer 10 itself and the situation of the Initiator terminal.

Corresponding Relationship

The printer 10, the display unit 14, and the Wi-Fi I/F 16 are respectively an example of a "first communication device", a "display unit", and a "wireless interface". The AP-QR code and the WFD-QR code are examples of "output information". The Initiator terminal (such as the terminal 100) is an example of a "second communication device". The AReq (i.e., the DPP Authentication Request) is an example of an "authentication request". The ARes (i.e., the DPP Authentication Response) is an example of a "first authentication response (and a second authentication response)". The capability "Configurator" and the capability "Enrollee" are respectively an example of "first role information" and "second role information". The first terminal-CO in T610 of FIG. 9 is an example of "first wireless setting information". The first printer-CO in T310 of FIG. 5 is an example of "second wireless setting information". The AP 6 is an example of a "first access point". In the case with the line number 1 in FIG. 16, the AP 6 is an example of a "second access point". In the case with the line number 3 in FIG. 16, the AP 8 is an example of the "second access point". In the AReq in T510 of FIG. 8, the value indicating being capable of operating only as the Enrollee as the capability of the terminal 200 is an example of "predetermined information". The MAC address "mac_ap" and the MAC address "mac_wfd" are respectively an example of "first use information" and "second use information". The AP information 44 is an example of "access point information".

T106 of FIG. 3 is an example of "execute an output control process". S2, S10, S32, and S42 of FIG. 7 are respectively an example of "receive an authentication request", "determine whether a wireless connection is established between the first communication device and one of access points", "send a first authentication response", and "send a second authentication response". T310 of FIG. 5 and T420 of FIG. 6 are respectively an example of "receive the second wireless setting information" and "establish the second wireless connection". T610 of FIG. 9 is an example of "send the first wireless setting information".

(Variant 1) The printer 10 may cause the print execution unit 18 to print the QR code instead of displaying the QR code in T106 of FIG. 3. In this variant, a process of causing the print execution unit 38 to print the QR code is an example of an "output control process".

(Variant 2) Each of the printer 10 and the terminal 100 may further include a wireless interface (such as a BT (abbreviation of Bluetooth (Registered Trademark, Bluetooth SIG, Inc)) I/F or a NFC (abbreviation of Near Field Communication) I/F) that complies with a wireless scheme that differs from the Wi-Fi scheme (such as a BT scheme or a NFC scheme). In this case, in T106 of FIG. 3, the printer 10 may instruct the BT I/F of the printer 10 to send DPP information including the public key PPK1 and the MAC address "mac_ap", for example. In this case, the terminal 100 can receive the DPP information via the BT I/F of the terminal 100. In this variant, instructing the BT I/F to send the DPP information is an example of the "output control process". Further, in another variant, in T106 of FIG. 3, the printer 10 may cause the NFC I/F of the printer 10 to store the DPP information. In this case, the terminal 100 can receive the DPP information via the NFC I/F of the terminal 100. In this variant, causing the NFC I/F to store the DPP information is an example of the "output control process".

(Variant 3) The printer 10 may execute the process of FIG. 2 in conformity with, instead of the DPP scheme, a scheme included in the Wi-Fi scheme (such as a Wi-Fi Protected Setup (WPS) scheme) using, a wireless profile (i.e., a Service Set Identifier (SSID) and a password) to establish the AP connection with the AP 6. In this case, in the Config process, the printer 10 may send the first terminal-CO that includes the wireless profile stored in the printer 10 in conformity with the other scheme instead of the first terminal-SC to the terminal 200. Accordingly, the terminal 200 can establish the AP connection with the AP 6 using the received wireless profile. In this variant, the wireless profile is an example of the "first wireless setting information". Further, in this variant, in S4 of FIG. 7, the printer 10 may determine whether the wireless profile is stored as the AP information 44. In this variant, the wireless profile is an example of the "access point information".

(Variant 4) The terminal 200 may execute the process in Case B in conformity with, instead of the DPP scheme, a scheme included in the Wi-Fi scheme (such as the Wi-Fi Protected Setup (WPS) scheme) to establish the AP connection with the AP 8. In this case, the printer 10 may receive the first terminal-CO that includes the wireless profile stored in the terminal 200 in conformity with the other scheme instead of the first terminal-SC from the terminal 200. In this variant, the wireless profile is an example of the "second wireless setting information".

(Variant 5) The Wi-Fi I/F 116 may support a SoftAP scheme established by the Wi-Fi Alliance instead of the WFD scheme. In this case, the selection screen in T102 of FIG. 3 may include a "SoftAP Communication" button instead of the "WFD Communication" button. Here, the AP-QR code displayed in the case where the "AP Communication" button in the selection screen is selected is obtained by encoding the public key PPK1 and first information indicating to use communication via the AP. On the other hand, a SoftAP-QR code for Soft AP communication displayed in a case where the "SoftAP Communication" button in the selection screen is selected is obtained by encoding the public key PPK1 and second information indicating to use communication in conformity with the SoftAP scheme with no intervention of APs. Further, in this variant, the printer 10 may determine in the Auth process whether the AReq includes the first information instead of the determination in S4 of FIG. 7. The printer 10 may proceed to S10 and establish the AP connection with an AP (such as the AP 6) in a case of determining that the AReq includes the first information. Further, the printer 10 may determine the capability of the printer 10 as one of the "Configurator" and the "Enrollee" and establish a Wi-Fi connection with the Initiator terminal in conformity with the SoftAP scheme in a case of determining that the AReq includes the second information. In this variant, the first information and the second information are respectively an example of the "first use information" and the "second use information".

(Variant 6) The process of S12 of FIG. 7 may be skipped. That is, the program 40 may not include instruction corresponding to the process of S12. In this variant, in the case with the line number 3 in the table of FIG. 16, the printer 10 may determine the capability of the printer 10 as the "Configurator". Then, under the situation in which the AP connection is established between the Initiator terminal and the AP 8, the printer 10 may generate the first terminal-CO related to the AP 6 and send the first terminal-CO to the Initiator terminal. Then, the Initiator terminal may shift to the state of being connected to the AP 6 from the state of being connected to the AP 8. In this variant, "determine whether the authentication request includes predetermined information" and the "predetermined information" may be omitted.

(Variant 7) In a case where the printer determines YES in S2 of FIG. 7, the printer 10 proceed to S10 without a process of S4. That is, the WFD connection may not be established between the printer 10 and the Initiator terminal. In this variant, the processing load on the printer 10 can be reduced. In this variant, the "establish a third wireless connection", the "first use information", the "second use information", and a "third wireless connection" may be omitted.

(Variant 8) Without determining whether the AP information 44 is stored in the memory 34 (S10 of FIG. 7), the printer 10 may attempt to send a confirmation signal to APs and determine whether a response signal to this confirmation signal is received, for example. The printer 10 may proceed to S12 in a case of determining that the response signal is received, while the printer 10 may proceed to S16 in a case of determining that the response signal is not received. In this variant, the "access point information" may be omitted.

(Variant 9) The "first communication device" may not be the printer 10, and may instead by another device such as a scanner, a multi-function device, a portable terminal, a PC, and a server. Further, the "second communication device" may not be the terminal 100 or 200, and may instead be another device such as a printer, a scanner, a multi-function device, and a camera.

(Variant 10) One or more of the processes of FIGS. 2 to 15 may be implemented by hardware such as a logic circuit, instead implemented by software as described in the above embodiment.

What is claimed is:

1. A first communication device comprising:
   a wireless interface configured to execute wireless communication in conformity with a Wi-Fi standard, and
   a controller configured to:
   execute an output control process of externally outputting output information, the output information being in conformity with the Wi-Fi standard and obtained using a public key of the first communication device;
   receive, via the wireless interface, an authentication request in which the public key is used from a second communication device that has obtained the public key;
   determine whether a wireless connection has been established between the first communication device and any one of access points;
   in a case where it is determined that a wireless connection has been established between the first communication device and a first access point:
      send a first authentication response to the second communication device via the wireless interface, the first authentication response including first role information indicating that the first communication device is to serve a first role which is a role of sending first wireless setting information to the second communication device, the first wireless setting information being for establishing a first wireless connection between the second communication device and the first access point; and
      send the first wireless setting information to the second communication device via the wireless interface after the first authentication response has been sent to the second communication device;
   in a case where it is determined that no wireless connection has been established between the first communication device and any one of the access points:
      send a second authentication response to the second communication device via the wireless interface, the second authentication response including second role information indicating that the first communication device is to serve a second role which is different from the first role and is a role of receiving second wireless setting information from the second communication device, the second wireless setting information being for establishing a second wireless connection between the first communication device and a second access point;
      receive the second wireless setting information from the second communication device via the wireless interface after the second authentication response has been sent to the second communication device; and
      establish the second wireless connection with the second access point via the wireless interface using the second wireless setting information.

2. The first communication device according to claim 1, wherein the controller determines whether a wireless connection has been established between the first communication device and any one of the access points after the authentication request has been received from the second communication device.

3. The first communication device according to claim 1, wherein the controller is further configured to:
   determine, in a case where the authentication request has been received from the second communication device, whether the authentication request includes predetermined information indicating that the second communication device is to serve the second role,
   wherein the controller sends the first authentication response including the first role information to the second communication device via the wireless interface in a case where it is determined that the wireless connection has been established between the first communication device and the first access point, and the authentication request includes the predetermined information, and
   the controller sends the second authentication response including the second role information to the second communication device via the wireless interface in a case where it is determined that the wireless connection has been established between the first communication device and the first access point, and the authentication request does not include the predetermined information.

4. The first communication device according to claim 1, wherein
   the authentication request includes either first use information related to use of communication via an access point or second use information related to use of communication with no intervention of an access point,
   the controller determines whether a wireless connection has been established between the first communication device and any one of the access points in a case where the authentication request includes the first use information, and
   the controller is further configured to:
   establish a third wireless connection with the second communication device via the wireless interface in a case where the authentication request includes the second use information, the third wireless connection being established with no intervention of any one of the access points.

5. The first communication device according to claim 4, wherein the third wireless connection is a wireless connection in conformity with a Wi-Fi Direct scheme of the Wi-Fi standard.

6. The first communication device according to claim 5, wherein
   the first communication device serves the first role in a case where the first communication device is in a Group Owner state in conformity with the Wi-Fi Direct scheme, and
   the first communication device serves the second role in a case where the first communication device is in a Client state in conformity with the Wi-Fi Direct scheme.

7. The first communication device according to claim 1, wherein the output information is information in conformity with a Device Provisioning Protocol scheme of the Wi-Fi standard.

8. The first communication device according to claim 1, wherein the controller determines that the wireless connection has been established between the first communication device and the first access point in a case where access point information has been stored in a memory, the access point information being related to the first access point having established the wireless connection with the first communication device.

9. The first communication device according to claim 8, wherein the access point information includes a Signed Connector in conformity with a Device Provisioning Protocol scheme of the Wi-Fi standard.

10. The first communication device according to claim 1, wherein
the output information is a code image obtained by encoding the public key, and
the output control process is a process of causing a display unit to display the output information being the code image.

11. A non-transitory computer-readable recording medium storing computer-readable instructions for a first communication device, wherein
the first communication device comprising:
a processor; and
a wireless interface configured to execute wireless communication in conformity with a Wi-Fi standard,
wherein the computer-readable instructions, when executed by the processor, cause the first communication device to:
execute an output control process of externally outputting output information, the output information being in conformity with the Wi-Fi standard and obtained using a public key of the first communication device;
receive, via the wireless interface, an authentication request in which the public key is used from a second communication device that has obtained the public key;
determine whether a wireless connection has been established between the first communication device and any one of access points;

in a case where it is determined that a wireless connection has been established between the first communication device and a first access point:
send a first authentication response to the second communication device via the wireless interface, the first authentication response including first role information indicating that the first communication device is to serve a first role which is a role of sending first wireless setting information to the second communication device, the first wireless setting information being for establishing a first wireless connection between the second communication device and the first access point; and
send the first wireless setting information to the second communication device via the wireless interface after the first authentication response has been sent to the second communication device;

in a case where it is determined that no wireless connection has been established between the first communication device and any one of the access points:
send a second authentication response to the second communication device via the wireless interface, the second authentication response including second role information indicating that the first communication device is to serve a second role which is different from the first role and is a role of receiving second wireless setting information from the second communication device, the second wireless setting information being for establishing a second wireless connection between the first communication device and a second access point;
receive the second wireless setting information from the second communication device via the wireless interface after the second authentication response has been sent to the second communication device; and
establish the second wireless connection with the second access point via the wireless interface using the second wireless setting information.

* * * * *